United States Patent
Katayama et al.

(10) Patent No.: US 7,321,533 B2
(45) Date of Patent: Jan. 22, 2008

(54) OPTICAL PICKUP DEVICE HAVING A WAVELENGTH SELECTING FILM AND AN OPTICAL REFLECTOR

(75) Inventors: Hiroshi Katayama, Higashi-Hiroshima (JP); Shinichi Tokuno, Higashi-Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 591 days.

(21) Appl. No.: 10/391,185

(22) Filed: Mar. 19, 2003

(65) Prior Publication Data

US 2003/0218952 A1 Nov. 27, 2003

(30) Foreign Application Priority Data

Mar. 20, 2002 (JP) ............................ P2002-078806
Sep. 12, 2002 (JP) ............................ P2002-266567

(51) Int. Cl.
 *G11B 7/125* (2006.01)
(52) U.S. Cl. ................................ 369/53.26; 369/112.21
(58) Field of Classification Search ............. 369/53.26, 369/121, 112.21, 112.01, 121.2; *G11B 7/125, G11B 7/135, 7/36, 7/16*
See application file for complete search history.

(56) References Cited

U.S. PATENT DOCUMENTS 6,195,315 B1 * 2/2001 Takahashi et al. ........ 369/44.23
6,317,400 B1 * 11/2001 Yanagawa et al. ........ 369/53.26
6,463,023 B1 10/2002 Miura
6,584,061 B2 * 6/2003 Yanagisawa et al. .. 369/112.17
6,810,001 B2 * 10/2004 Ohuchida .............. 369/112.07

FOREIGN PATENT DOCUMENTS

| JP | 3-269835 | 12/1991 |
|---|---|---|
| JP | 08-102080 | 4/1996 |
| JP | 11-328708 | 11/1999 |
| JP | 2000-331365 | 11/2000 |
| JP | 2001-043553 | 2/2001 |
| JP | 2001-118281 | 4/2001 |
| JP | 2002-092929 | 3/2002 |
| JP | 2002-100069 | 4/2002 |
| JP | 2002-358683 | * 12/2002 |

* cited by examiner

*Primary Examiner*—Aristotellis M. Psitos
(74) *Attorney, Agent, or Firm*—Morrison & Foerster LLP

(57) ABSTRACT

An optical pickup device has first and second light sources that emit first and second laser beams of different wavelengths, an object lens that concentrates the first and second laser beams on a data recording surface of an optical disk, an optical separator disposed between the first and second light sources and the object lens, and an optical monitor that detects a quantity of light of the second laser beam. The optical separator has a wavelength selecting film that, on one hand, reflects the first laser beam emitted from the first light source toward the object lens and, on the other hand, transmits the second laser beam emitted from the second light source to the object lens, and a reflector that reflects a part of the second laser beam emitted from the second light source toward the optical monitor.

17 Claims, 25 Drawing Sheets

OPTICAL PICKUP DEVICE HAVING A WAVELENGTH SELECTING FILM AND AN OPTICAL REFLECTOR

BACKGROUND OF THE INVENTION

The present invention relates to an optical pickup device provided with a plurality of laser beam emitting sources.

Conventionally, as an optical pickup device for performing recording and reproduction of an optical disk, there is one that can cope with two types of optical disks. This kind of optical pickup device is required to use laser beams of different wavelengths according to the types of the optical disks. For example, when executing both recording and reproduction of a CD and a DVD, the optical pickup device is provided with a first laser device that emits a laser beam for executing write and read of data on the CD and a second laser device that emits a laser beam for executing write and read of data on the DVD.

FIG. 28 shows a schematic view of the aforementioned conventional optical pickup device. This optical pickup device has a first light source 211 that emits a first laser beam of a wavelength $\lambda 1$ for data reproduction, a second light source 212 that emits a second laser beam of a wavelength $\lambda 2$ for data reproduction and data recording, an optical separator 213, an optical monitor 215 for the second light source and an object lens 214.

The optical separator 213 is formed by bonding one side surface of a first triangular prism 216 located on the first light source 211 side to one side surface of a second triangular prism 217 located on the second light source 212 side, with a wavelength selecting film 218 being placed therebetween.

The wavelength selecting film 218 of the conventional optical pickup device transmits only several percent of the first laser beam of the wavelength $\lambda 1$ emitted from the first light source 211, while reflecting most of the first laser beam of the wavelength $\lambda 1$ emitted from the first light source 211. On the other hand, the wavelength selecting film 218 reflects only several percent of the second laser beam of the wavelength $\lambda 2$ emitted from the second light source 212 while transmitting most of the second laser beam of the wavelength $\lambda 2$ emitted from the second light source 212. Then, the several percent of the second laser beam reflected by the wavelength selecting film 218 is made incident on the second light source optical monitor 215 to execute control of the optical output of the second light source.

With the aforementioned construction, when data written on a loaded optical disk 210 is read by the first laser beam of the wavelength $\lambda 1$ emitted from the first light source 211, the laser beam emitted from the first light source 211 is reflected by the wavelength selecting film 218 toward the object lens 214 and thereafter concentrated on one point of the optical disk 210 by the object lens 214. Then, data (pit information, for example) of the optical disk 210 is extracted by a hologram element, a light-receiving element or the like (not shown) from the first laser beam that was reflected from the one point of the optical disk 210 and passed again through the object lens 214. In order to control the optical output of the first light source 211, this optical pickup device detects the quantity of light of the laser beam emitted from the first light source 211 by means of an optical monitor (not shown) for the first light source, the monitor being provided inside the same package as that of the first light source 211.

On the other hand, when data written on a loaded optical disk 210 (even in the case of a different optical disk, the optical disk is denoted by the same reference numeral 210) is read by the second laser beam of the wavelength $\lambda 2$ emitted from the second light source 212, the second laser beam is transmitted through the wavelength selecting film 218 and thereafter concentrated on one point of the optical disk 210 by the object lens 214. Then, the data written on the optical disk is extracted by the hologram element, light-receiving element or the like (not shown) from the second laser beam that was reflected by the one point of the optical disk 210 and passed again through the object lens 214.

When data is written on a loaded optical disk 210 by the second laser beam of the wavelength $\lambda 2$ emitted from the second light source 212, the data write is performed by transmitting the second laser beam emitted from the second light source 212 through the wavelength selecting film 218 and thereafter concentrating the beam on one point of the optical disk 210 by means of the object lens 214. In order to control the optical output of the second light source 212, the optical pickup device detects the quantity of light of the second laser beam emitted from the second light source 212 and reflected by the wavelength selecting film 218, by means of the second light source optical monitor 215.

Optical signals detected by the first light source optical monitor and the second light source optical monitor 215 are converted into respective electrical signals, and these electrical signals are inputted to an automatic power control (APC) circuit (not shown) provided on the optical pickup device or outside the optical pickup device. Then, outputs of the automatic power control circuit, corresponding to the optical signals of the first light source optical monitor and the second light source optical monitor 215, are fed back to the first and second light sources 211 and 212 to control the optical outputs of the first and second light sources 211 and 212.

However, in the aforementioned conventional optical pickup device, several percent of the second laser beam emitted from the second light source 212 is reflected by the wavelength selecting film 218 and made incident on the second light source optical monitor 215 in order to control the optical output of the second light source 212. Accordingly, there is a problem that the quantity of light transmitted through the wavelength selecting film 218 and applied onto the optical disk 210 by the object lens 214 is reduced by the quantity of light reflected by the wavelength selecting film 218 toward the monitor 215. In other words, there is a problem that the data reproducing capability of the optical disk 210 (or data recording capability on the optical disk 210) using the second laser beam emitted from the second light source 212 is reduced by the reduction in the light quantity or intensity of the second laser beam incident on the optical disk 210.

Moreover, in order to avoid this problem, if it is attempted to design the reflectance of the wavelength selecting film 218 with respect to the laser beam emitted from the second light source 212 to a smallest possible value, for example, a small value of about 5%, there arises another problem as follows. That is, according to the current mass production technology, the reflectance of the wavelength selecting film 218 has a variation of about ±4%. Therefore, if it is attempted to set the reflectance of the wavelength selecting film 218 with respect to the second laser beam emitted from the second light source 212 at, for example, 5%, then the reflectance is varied within a range of 1% to 9%. For this reason, the dynamic range (a ratio of the minimum value to the maximum value) of the quantity of light of the second laser beam, which is emitted from the second light source 212, reflected by the wavelength selecting film 218 and made incident on the second light source optical monitor 215, has about ninefold variations, and this leads to a failure in accurately detecting the optical output of the second light source 212.

There is a further problem that, when the reflectance is varied to the smaller values, then the quantity of the laser light incident on the second light source optical monitor 215 is reduced, and the S/N ratio (signal/noise ratio) of the optical signal in the second light source optical monitor 215 is reduced, resulting in difficulties in detecting the quantity of the optical output of the second light source 212.

Moreover, if the wavelength $\lambda 2$ of the second laser beam of the second light source 212 fluctuates due to a temperature change or the like, then the reflectance of the wavelength $\lambda 2$ of the second laser beam on the wavelength selecting film 218 fluctuates, and the quantity of light incident on the second light source optical monitor 215 is to fluctuate. In general, if the reflectance is set low as described above, a fluctuation in reflectance due to a wavelength change is increased, and this leads to a problem that the quantity of light of the second light source 212 cannot be accurately detected by the second light source optical monitor 215.

SUMMARY OF THE INVENTION

Accordingly, an object of the present invention is to provide an optical pickup device which is excellent in optical disk data reproducing capability and optical disk data recording capability and able to accurately detect the quantity of optical output of a laser light source even if the wavelength of the laser beam fluctuates.

Another object of the present invention is to provide such an optical pickup device which can provide a high production efficiency.

In order to accomplish the above objects, an optical pickup device according to the present invention includes:

a first light source that emits a first laser beam of a wavelength;

a second light source that emits a second laser beam of a wavelength different from the wavelength of the first laser beam;

an object lens that concentrates the first and second laser beams on a data recording surface of an optical disk;

an optical monitor that detects a quantity of light of the second laser beam; and an optical separator having a wavelength selecting film that, on one hand, reflects the first laser beam emitted from the first light source toward the object lens and, on the other hand, transmits the second laser beam emitted from the second light source to the object lens, and a reflector that reflects a part of the second laser beam emitted from the second light source toward the optical monitor.

With the above construction, when data written on the data recording surface of an optical disk (for data read) is read by the first laser beam emitted from the first light source, the laser beam emitted from the first light source is reflected by the wavelength selecting film toward the object lens and thereafter concentrated on the data recording surface of the optical disk by the object lens. Then, the data (pit information, for example) of the optical disk is extracted by a hologram element, a light-receiving element or the like from the laser beam which was reflected by the data recording surface of the optical disk and passed again through the object lens.

When data is written on an optical disk (for data write) by the first laser beam emitted from the first light source, the data write is performed by reflecting the laser beam coming from the first light source by the wavelength selecting film toward the object lens and thereafter concentrating the beam on the data recording surface of the optical disk by the object lens.

The quantity of light emitted from the first light source is normally larger when data is written on an optical disk than when data is read from an optical disk. Thus, the quantity of light emitted from the first light source must be controlled. For that purpose, the quantity of light of the first light source is detected by, for example, a first light source optical monitor provided inside a package of the first light source, and thereafter, this quantity of emitted light is converted into an electrical signal. This electrical signal is inputted to an automatic power control circuit provided at the optical pickup device or outside the optical pickup device. Then, an output from this automatic power control circuit is fed back to the first light source to control the optical output of the first light source.

When data written on an optical disk is read by the second laser beam emitted from the second light source, the laser beam emitted from the second light source is transmitted through the wavelength selecting film and thereafter concentrated on the data recording surface of the optical disk by the object lens. Then, the data written on the data recording surface of the optical disk is extracted by a hologram element, a light-receiving element or the like from the light beam which was reflected by the data recording surface of the optical disk and passed again through the object lens.

When data is written on an optical disk by the second laser beam emitted from the second light source, the data write is executed by transmitting the second laser beam emitted from the second light source through the wavelength selecting film and thereafter concentrating the laser beam on the data recording surface of the optical disk by the object lens.

Also, in the case of the second light source, the quantity of light emitted from the second light source for writing data on an optical disk is normally larger than the quantity of light emitted from the second light source for data read from the optical disk, similarly to the first light source. Thus, the quantity of light emitted from the first light source must be controlled. For that purpose, the second laser beam emitted from the second light source and incident on the reflector is reflected by the reflector toward the optical monitor, and the quantity of light of the second laser beam incident on the optical monitor is detected. At this time, due to the provision of the reflector such as a reflection mirror, the quantity of light of the second beam received by the optical monitor is prevented from fluctuating even if the wavelength of the second laser beam fluctuates because of factors such as temperature change. Thus, the light quantity of the second laser beam is accurately detected by the optical monitor. Thereafter, the light quantity of the second laser beam incident on the optical monitor is converted into an electrical signal, and this electrical signal is inputted to the automatic power control circuit. Then, the optical output from this automatic power control circuit is fed back to the second light source to control the optical output of the second light source.

According to the optical pickup device of this invention, by appropriately adjusting the positions of the wavelength selecting film and the reflector, the second laser beam in an effective region, which is emitted from the second light source and made incident on the wavelength selecting film, can be substantially totally transmitted toward the object lens. The second laser beam in the effective area is not required to be reflected by several percent from the wavelength selecting film, dissimilarly to the conventional optical pickup device. Therefore, the quantity of light of the second laser beam to be concentrated on the data recording surface of the optical disk via the object lens is increased, and the data reproducing capability and the data recording capability of the optical pickup device can be improved.

In one embodiment, the reflector is arranged in the vicinity of the wavelength selecting film, on which components of a laser beam in an effective region used for data write and read are incident. A position "in the vicinity of the wavelength selecting film" herein means a position close to the wavelength selecting film to such a degree that components of the laser beam outside the effective region can enter.

In one embodiment, the reflector is a reflection mirror.

In one embodiment, the reflector is a half-reflection film which is laid on the wavelength selecting film. The reflector may be laid directly on the wavelength selecting film or with interposition of a light-transmitting layer therebetween.

In one embodiment, the reflector is formed so as not to be in contact with the wavelength selecting film.

In order to reflect part of the second laser beam incident on the wavelength selecting film toward the optical monitor, there may be adopted a method in which a reflection coating for reflecting part of the second laser beam is formed directly on the wavelength selecting film, which may be formed on one triangular prism that constitutes part of the optical separator. In this case, however, there will occur problems that the wavelength selecting film is altered, or changed in quality, with a film stress applied to the wavelength selecting film, i.e., a groundwork, in a vapor deposition process for forming the reflection film on the wavelength selecting film, and that the wavelength selecting film of the groundwork is disadvantageously damaged by heat during the vapor deposition of the reflection film or by the handling work, leading to a problem that the production efficiency of the optical separator is reduced.

In the embodiment, however, the optical separator is formed so that the wavelength selecting film and the reflector are not brought in contact with each other, and therefore, the wavelength selecting film and the reflector can be formed independently in different processes. Therefore, it is possible to avoid the problems occurring in the case in which a reflection film as the reflection member is formed directly on the wavelength selecting film, allowing the manufacturing yield of the optical separators to be improved and allowing the manufacturing cost of the optical separator to be reduced.

In one embodiment, the optical separator has a first prism located on the first light source side and a second prism located on the second light source side. At least a part of one side surface of the first prism is bonded to at least a part of one side surface of the second prism with the wavelength selecting film placed between at least a part of the one side surface of the first prism and at least a part of the one side surface of the second prism. And, the reflector is arranged on the first prism or the second prism.

In this specification, the "prism" is defined as an object that has a roughly prism-like shape (at least one of side surfaces of a prismatic body may be a curved surface) constructed of a transparent material such as glass, acrylic, crystal, resin, synthetic quartz, BK-7 or the like, and the "triangular prism" is defined as a prism of which a cross section in the direction perpendicular to the columnar direction of the prismatic body is of a triangular shape, with the triangular cross section having an approximately constant area. Moreover, in this specification, the "rectangular prism" is defined as a prism of which a cross section in the direction perpendicular to the columnar direction of the prismatic body is of a right-angled triangular shape, with the right-angled triangular cross section having an approximately constant area. Moreover, when the term of "side surface" is used in this specification, this side surface means a surface that extends in the columnar direction of a prism.

In one embodiment, one of the rectangular prisms has a longer base than the other rectangular prism, and the reflector is arranged in a portion of the base of the one rectangular prism that protrudes from a base of the other rectangular prism.

In this specification, of three sides of a right triangle which is a section of the rectangular prism, a side opposite to the right angle of the right triangle is meant by the term "base" of the rectangular prism.

The provision of the reflector at the base of one of the rectangular prisms prevents a space for arranging the reflector from increasing, and hence prevents the size of the optical pickup device from increasing. In addition, due to the provision of the reflector at the base of one of the rectangular prisms, the positioning of the optical separator achieves a simultaneous positioning of the reflector.

The base of the rectangular prism of which the base is made longer may be positioned in place, and the reflector may be superposed on the base. The positioning of the base of the rectangular prism achieves a simultaneous positioning of the reflector, so that the position of the reflector can be set at a high accuracy.

In one embodiment, one of the rectangular prisms has an increased width, and the reflector is arranged on a base portion of the one rectangular prism that protrudes in a widthwise direction from the other rectangular prism. In this case as well, a space for arranging the reflector (arrangement space) is restrained from increasing, and hence the size of the optical pickup device is prevented from increasing.

Note that in this specification, the "width" of the rectangular prism means a length in the columnar direction of the rectangular prism.

In one embodiment, the reflector is mounted on either the first prism or the second prism at an angle that allows the part of the second laser beam to be reflected and conducted to the optical monitor. This arrangement increases the freedom of position of the optical monitor.

In one embodiment, the wavelength selecting film is arranged on the one side surface of the first prism, while the reflector is arranged on the one side surface of the second prism. The one side surface of the first prism with the wavelength selecting film is bonded, with an adhesive, to the one side surface of the second prism with the reflector.

According to the optical pickup device of the above-mentioned embodiment, it is possible to arrange the wavelength selecting film on the first prism and arrange the reflector on the second prism before bonding the prisms together at at least part of the one side surface thereof. Therefore, the process for forming the wavelength selecting film on the first prism and the process for forming the reflector on the second prism can be concurrently carried out, and the productivity of the optical separator can be improved. Moreover, the member on which the wavelength selecting film is formed and the member on which the reflector is formed are different members. Therefore, the manufacturing yield of the optical separator can be further improved, and the manufacturing cost of the optical separator can be further reduced.

The optical characteristics, such as reflectance, transmittance and so on, of the wavelength selecting film depend on the refractive indices of the film composition of the wavelength selecting film and of members in contact with the film. Therefore, according to the optical pickup device of the above-mentioned embodiment, by placing a layer of the adhesive between the wavelength selecting film and the reflector to thereby keep the wavelength selecting film and the reflector from direct contact with each other, the optical characteristics of the wavelength selecting film can be set independently of the reflector (not depending on the reflector). Therefore, flexibility is provided in selecting the position and material of the reflector that reflects the second laser beam of the second light source to the second light source monitor. As a result, flexibility is provided also in selecting the arrangement position of the optical monitor. The optical pickup device can be downsized by effectively utilizing the above-mentioned selection flexibilities.

In one embodiment, the first and second prisms are triangular prisms. Because the triangular prisms are inexpensive, the costs of the optical separator can be suppressed.

In one embodiment, the wavelength selecting film roughly totally reflects the first laser beam and roughly totally transmits the second laser beam.

According to the optical pickup device of the above-mentioned embodiment, the wavelength selecting film has a reflectance of approximately 100% with respect to the first laser beam. Therefore, the quantity of light of the first laser beam, which is emitted from the first light source, reflected by the wavelength selecting film and concentrated by the object lens and reaches the data recording surface of the optical disk, can be increased. Moreover, the wavelength selecting film transmits approximately the whole second laser beam, and therefore, the quantity of light of the second laser beam, which is emitted from the second light source, transmitted through the wavelength selecting film and concentrated by the object lens and reaches the data recording surface of the optical disk, can be increased. Therefore, the capability of the optical pickup device in writing data on an optical disk and the capability of the optical pickup device in reading data from the optical disk can be improved.

In one embodiment, a luminous flux diameter of the first laser beam incident on and reflected from the wavelength selecting film to the object lens is larger than a luminous flux diameter of the second laser beam transmitted through the wavelength selecting film to the object lens.

According to the optical pickup device of the above-mentioned embodiment, the area of the reflector of the second light beam can be increased. Therefore, the quantity of light of the second laser beam incident on the optical monitor can be increased. Therefore, the signal-to-noise ratio of the signal outputted from the optical monitor can be improved, and the output of the second light source can be accurately detected.

In one embodiment, the optical separator is arranged in optical paths of radiant light beams emitted from the first light source and the second light source, and an optical path length of the first laser beam, which is emitted from the first light source and travels through the optical separator, is longer than an optical path length of the second laser beam, which is emitted from the second light source and travels through the optical separator.

According to the optical pickup device of the above-mentioned embodiment, due to the optical path length of the first laser beam being longer than the optical path length of the second laser beam, a beam convergence point at which the second laser beam emitted from the second light source is converged by the object lens can be located farther away from the optical separator than a beam convergence point at which the second laser beam emitted from the second light source is converged by the object lens. Therefore, even if there is a difference in the substrate thickness between two types of optical disks (hereinafter referred to as a first optical disk and a second optical disk) used by the optical pickup device so that there occurs a difference between a distance (referred to as a first distance) from the object lens to the substrate of the first optical disk and a distance (referred to as a second distance) from the object lens to the substrate of the second optical disk, the difference in the substrate thickness between the first and second optical disks can be managed by adjusting the distance between the above-mentioned two beam convergence points to the difference between the first distance and the second distance. In other words, it is not necessary to adopt an approach of increasing the operating range of the object lens in managing the difference between the positions of the beam convergence points. Therefore, the optical pickup device can be constructed compact.

In one embodiment, the optical separator is arranged in optical paths of radiant light beams emitted from the first light source and the second light source, and the reflector is arranged in a position located not adjacent to the second light source.

According to the optical pickup device of the above-mentioned embodiment, by appropriately arranging the reflector in the position not located adjacent to the second light source, an incidence angle $\theta$ of the second laser beam on the reflector can be increased. Therefore, the optical monitor can be arranged in the position far away from the second light source. Therefore, even when a semiconductor laser is adopted as the second light source as usual, a package of metal or the like that is covering the semiconductor laser for heat dissipation and environmental resistance can be arranged in a position away from the optical monitor. Therefore, the optical pickup device can be made compact.

In one embodiment, the optical pickup device has a hologram element between the second light source and the optical separator, and at least part of light emitted from the second light source and diffracted by the hologram element is reflected by the reflector and made incident on the optical monitor.

According to the optical pickup device of the above-mentioned embodiment, the diffracted light, which was emitted from the second light source and diffracted by the hologram element pattern, is used as the second laser beam to be incident on the optical monitor. Therefore, components of the second laser beam that are located closer to the central effective region and have relatively higher intensity can be guided to the optical monitor. Therefore, the quantity of light emitted from the second light source can be accurately detected with an improved signal-to-noise ratio in the output of the optical monitor.

In one embodiment, assuming that an angle made between an optical axis of the second laser beam that is emitted from the second light source and travels in a straight line without being diffracted by the hologram element, a normal line of the wavelength selecting film of the optical separator is $\theta a$, and that a diffraction angle of a first-order diffracted light, which was originally emitted from the second light source and primarily diffracted by the hologram element and will be made incident on the optical monitor via the reflector, is $\theta h$, then a condition of $2\theta a + \theta h \approx 90°$ holds.

According to the optical pickup device of the above-mentioned embodiment, an angle made between the second laser beam reflected by the reflector and incident on the optical monitor, and the zero-order light which is emitted from the second light source and not diffracted by the hologram element, is allowed to be approximately 90°. Therefore, the second laser beam can easily be made incident perpendicularly to a light-receiving surface of the optical monitor, and the quantity of incident light of the second beam per unit area of the light-receiving surface can be maximized. Therefore, the quantity of light emitted from the second light source can be accurately detected with an improved signal-to-noise ratio of the signal outputted from the optical monitor.

Moreover, by arranging the optical monitor parallel to the optical axis of the zero-order light, flexibility is provided in the component arrangement inside the optical pickup device, and therefore, the optical pickup device can be downsized.

In one embodiment, the angle θa made between an optical axis of the second laser beam that is emitted from the second light source and travels in a straight line without being diffracted by the hologram element, and the normal line of the wavelength selecting film of the optical separator satisfies a condition of 30°≦θa≦37°. Also, the diffraction angle θh of the first-order diffracted light satisfies a condition of 11°≦θh≦35°.

According to the optical pickup device of the above-mentioned embodiment, the condition that 11°≦θh≦35° is imposed upon the angle θh. Accordingly, a balance can be struck between a requirement that the value of θh should be large from the viewpoint of preventing diffracted light, which is not the zero-order light, for writing data on an optical disk and/or reading data on the optical disk, from being applied to the optical disk and becoming an unnecessary stray light and a requirement that the value of θh should be small from the viewpoint of mass productivity requiring no miniaturization of the hologram pattern of the hologram element. Moreover, since the condition that 30°≦θa≦37° is imposed on the angle θa, a balance can be struck among the condition that θa should be closer to 0° (i.e., a vertical incidence angle) to obtain a better wave surface of the first light beam reflected by the wavelength selecting film, the condition of 11°≦θh≦35°, and the condition of 2θa+θh≈90°. Therefore, the optical pickup device is allowed to have high quality.

In one embodiment, the optical separator has a triangular prism located on the first light source side and a rectangular prism located on the second light source side. At least a part of one side surface of the triangular prism located on the first light source side is bonded to at least a part of one side surface of the rectangular prism located on the second light source side with the wavelength selecting film placed between at least a part of the one side surface of the triangular prism and at least a part of one side surface of the rectangular prism. The optical separator is arranged in optical paths of radiant light beams emitted from the first light source and the second light source. Also, the reflector is arranged on the one side surface of the rectangular prism and at an object lens-side position.

According to the optical pickup device of the above-mentioned embodiment, because the prism located on the second light source side is constructed of a rectangular prism, which can easily be processed and is suitable for mass production, the cost can be reduced.

Moreover, because the prism located on the second light source side is a rectangular prism, the direction of the second laser beam, which was emitted from the second light source, diffracted by the hologram element and further reflected by the reflector, is allowed to coincide with the normal line direction of a side surface of the rectangular prism that is located on the optical monitor side. Because the second laser beam is not refracted by this side surface, it is not required to take a possible deviation of the second laser beam due to the refraction into consideration in deciding the arrangement of the optical monitor. Thus, the design of the optical pickup device can be simplified.

In one embodiment, the rectangular prism has a side surface facing the optical monitor, the side surface including a light scattering surface for scattering the second laser beam reflected by the reflector and incident on the light scattering surface.

With this construction, a trace quantity of the second laser beam, which was reflected by the reflector but not transmitted through the side surface, can be scattered and dispersed. This avoids a phenomenon that the second laser beam, which is reflected perpendicularly at a reflectance of about 0.5 to 1% even when an anti-reflection coating (AR coating) is provided on the side surface located on the optical monitor side, returns to the optical system roughly reversely through the path of incidence on the side surface and becomes a stray light. This in turn prevents the degradation in the optical disk recording and reproducing characteristics and allows the optical pickup device operation to be stabilized.

In one embodiment, the reflector comprises a dielectric deposition reflection coating or a metal deposition reflection coating.

In this case, even if the wavelength of the second laser beam emitted from the second light source is changed by a temperature change or the like, the reflectance is not influenced, and the quantity of light of the second light source can be accurately detected by the optical monitor.

In one embodiment, the reflector comprises a reflection type diffraction grating.

The angle of reflection of the second laser beam can easily be adjusted by changing the grating pitch of the reflection type diffraction grating. Therefore, flexibility is provided in selecting the arrangement of the optics from the second light source to the optical monitor, whereby the optical pickup device can be made compact.

In one embodiment, the reflector comprises a noncontact surface which is provided in a location on the one side surface side of the second prism so as not to be brought in contact with the one side surface of the first prism.

In the above embodiment, by adjusting the position of the noncontact surface so that the second laser beam emitted from the second light source is reflected by the noncontact surface and made incident on the optical monitor, the reflector can be formed in a simple construction and at low price. Therefore, the cost of the optical separator can be reduced, and the mass productivity of the optical separator can be improved.

In one embodiment, the second prism is a triangular prism, and the noncontact surface is provided to the second prism by forming the first prism into a configuration of a triangular prism with a noncontact surface-side corner thereof cut off such that the second prism has, on its noncontact surface side, a surface roughly parallel to an optical axis of the second laser beam to be incident on the object lens.

By virtue of the specific configuration of the first prism, the areas of first and second laser beam emitting surfaces, from which the first and second laser beams emit, of the first prism in the optical separator can be increased. Therefore, the first and second laser beams can reliably be made incident on the object lens, so that the optical disk data reproducing capability and the optical disk data recording capability can be improved. Moreover, the area of the noncontact surface serving as the reflector can be enlarged, so that the quantity of light of the second laser beam incident on the optical monitor can be increased.

In one embodiment, the first and second prisms are triangular prisms.

In this case, the noncontact surface can be formed without subjecting a triangular prism to a cutting process. That is, the noncontact surface can be readily formed at low price by using a method of, for example, bonding the two triangular prisms of the same shape together with their two same side surfaces displaced appropriately from each other. Therefore, the manufacturing cost of the optical separator can be further reduced.

In one embodiment, the first prism is a triangular prism, and the second prism has a noncontact surface which continues, via a stepped portion, to the surface bonded to the first prism and which is not brought in contact with the first prism.

By appropriately processing the noncontact surface so as to adjust the incidence angle of the second laser beam on the noncontact surface, the place where the optical monitor is arranged can simply be adjusted to a position convenient for the downsizing of the optical pickup device.

In one embodiment, the second prism is a triangular prism, and the first prism has a noncontact surface which continues, via a stepped portion, to the surface bonded to the second prism and which is not brought in contact with the second prism.

In the embodiment, an edge portion located on the second light source side of the stepped portion hardly scatters the second laser beam. Therefore, the occurrence of the unnecessary stray light in the optical pickup device can be restrained.

In one embodiment, the first prism is a first triangular prism and the second prism is a second triangular prism, and at least a part of one side surface of the first triangular prism and a part of one side surface of the second triangular prism are bonded together via an adhesive layer.

In this case, it is not required to subject a triangular prism to a cutting process in forming the noncontact surface of the second triangular prism, or the reflector. Therefore, the optical separator can be manufactured simply at low price.

In one embodiment, the optical separator has a first prism located on the first light source side and a second prism located on the second light source side. At least a part of one side surface of the first prism is bonded to at least a part of one side surface of the second prism with the wavelength selecting film placed between at least a part of the one side surface of the first prism and at least a part of the one side surface of the second prism. Also, the reflector comprises a noncontact surface which is provided in a location on the one side surface side of the second prism so as not to be brought in contact with the one side surface of the first prism. Assuming that a refractive index of the second prism is n, an angle made between a normal line of the one side surface of the first prism and an optical axis of light components of the second laser beam which were not diffracted by the hologram element is $\theta a$, and that a diffraction angle of a first-order diffracted light, which was originally emitted from the second light source and primarily diffracted by the hologram element and will be made incident on the optical monitor via the reflector, is $\theta h$, then the following relationship holds.

$$n \times \sin(\theta a + (\sin^{-1}(\sin \theta h/n))) \geq 1$$

Due to the relationship between n, $\theta h$ and $\theta a$ defined by the expression of $n \times \sin(\theta a + (\sin^{-1}(\sin \theta h/n))) \geq 1$, the first-order diffracted light of the second laser beam diffracted by the hologram element can be reflected by the noncontact surface by approximately 100%. Therefore, the quantity of light of the second laser beam incident on the optical monitor can be increased.

In one embodiment, the optical separator includes a transparent member having a flat plate-like shape or a wedge-like shape. The wavelength selecting film is arranged on a first surface of the transparent member that faces the first light source, and the reflector is arranged in a part of a second surface of the transparent member that faces the second light source.

In this case, similarly to the case where the optical separator is formed of two separate members, it is possible to avoid the problems which would occur in the case that a wavelength selecting film is first formed on one side surface of a triangular prism and then a reflection film is formed on the wavelength selecting film, i.e., the problems that the wavelength selecting film is changed in quality, with a film stress applied to the wavelength selecting film, a groundwork, in a vapor deposition process for forming the reflection film, and that the wavelength selecting film of the groundwork is disadvantageously damaged by heat during the vapor deposition of the reflection film or by the handling work. Thus, in the embodiment, manufacturing yield of the optical separators can be improved, resulting in the reduction of the manufacturing cost of the optical pickup device.

Moreover, because the optical separator uses only one transparent member, or prism, it is unnecessary to perform the bonding process which is required when the optical separator uses two prisms. Also, only two surfaces facing the first and second light sources of the transparent member are required to be optical polished surfaces. As a result, as compared with the optical separator of the type in which two prisms are bonded together, the manufacturing cost of the optical separator can remarkably be reduced.

In one embodiment, the optical separator is arranged in an optical path of radiant light emitted from the first light source, and with respect to the first laser beam emitted from the first light source, the wavelength selecting film has a maximum reflectance in a region facing the reflector.

Therefore, a trace quantity of the first laser beam transmitted through the wavelength selecting film can be minimized in the region facing the reflector of the wavelength selecting film. Therefore, it is possible to avoid a problem that a trace quantity of the first laser beam, which was emitted from the first light source and transmitted through the wavelength selecting film, reaches the reflector and is reflected by this reflector to become stray light and a problem that the wave surface of the luminous flux of the first laser beam reflected in that region or the wavelength selecting film is disordered. Thus, the wavefront aberration of the luminous flux of the first laser beam can be maintained satisfactory. It is to be noted that, of all light components of the first laser beam transmitted through the wavelength selecting film, a trace quantity of light transmitted through the second light source side of the wavelength selecting film, is merely transmitted through the optical separator and causes no problem.

In one embodiment, the first prism is a triangular prism, and the second prism has a configuration of a triangular prism with a corner portion opposite from the wavelength selecting film cut off, and the reflector is arranged on a cut surface generated when the corner portion of the triangular prism is cut off.

In this case, the incidence angle of the second laser beam with respect to the reflector can be freely set without regard to the position of the wavelength selecting film, in comparison with the case where the wavelength selecting film and the reflector are arranged on the surfaces of the two prisms to be bonded together or in the vicinity of the surfaces to be bonded together. Therefore, flexibility is provided in selecting the arrangement place of the optical monitor, so that downsizing of the optical pickup device is possible.

In one embodiment, the reflector is provided by a surface of a material forming the second prism. In this case, the reflector can be easily formed merely by cutting off a part of the prism located on the second light source side and polishing a cut surface of the prism. Therefore, the manufacturing cost of the prism located on the second light source side on which the reflector is arranged can be reduced.

In one embodiment, the optical pickup device includes a polarization converter between the second light source and the reflector, and a polarization azimuth of the second laser beam, which is emitted from the second light source and made incident on the material surface, is made to be S-polarized light with respect to the reflector.

Because the reflectance of S-polarized light is higher than the reflectance of P-polarized light, a larger quantity of the second laser beam can be guided to the optical monitor.

In one embodiment, the incidence angle of the second laser beam with respect to the reflector is Brewster's angle.

This construction enables the reflectance of P-polarized light on the reflector to be zero, so that the spontaneous emission components, or P-polarized light components included a little in the second laser beam emitted from the second light source can be prevented from being incident on the optical monitor. Light to be concentrated on the optical disk consists of the S-polarized light components (stimulated emission components) of same wavelength and same phase in the second laser beam, and the optical monitor is allowed to detect only stimulated emission components of the second laser beam used in actually recording data on the optical disk or reading data from the optical disk.

In one embodiment, the second light source comprises a TM mode semiconductor laser device.

Use of the TM mode semiconductor laser device permits the elimination of the comparatively expensive polarization converter and allows S-polarized light to be incident on the reflector simply and at low price in comparison with the case where S-polarized light is made incident on the reflector by means of the polarization converter.

Moreover, since the polarization converter is eliminated, the optical pickup device can be made compact.

In one embodiment, the first prism is a triangular prism, and the second prism has a configuration of a triangular prism with a corner portion opposite from the wavelength selecting film cut into a concave surface and polished. The reflector is arranged on the concave surface.

With the reflector arranged on the concave surface, part of the divergent second laser beam emitted from the second light source is reflected by the concave surface toward a light-receiving surface of the optical monitor and converged on the light-receiving surface of the optical monitor by the action of the concave surface. Therefore, a larger quantity of the second laser beam can be made incident on the optical monitor.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE PREFERRED EMBODIMENTS

Figure 1:
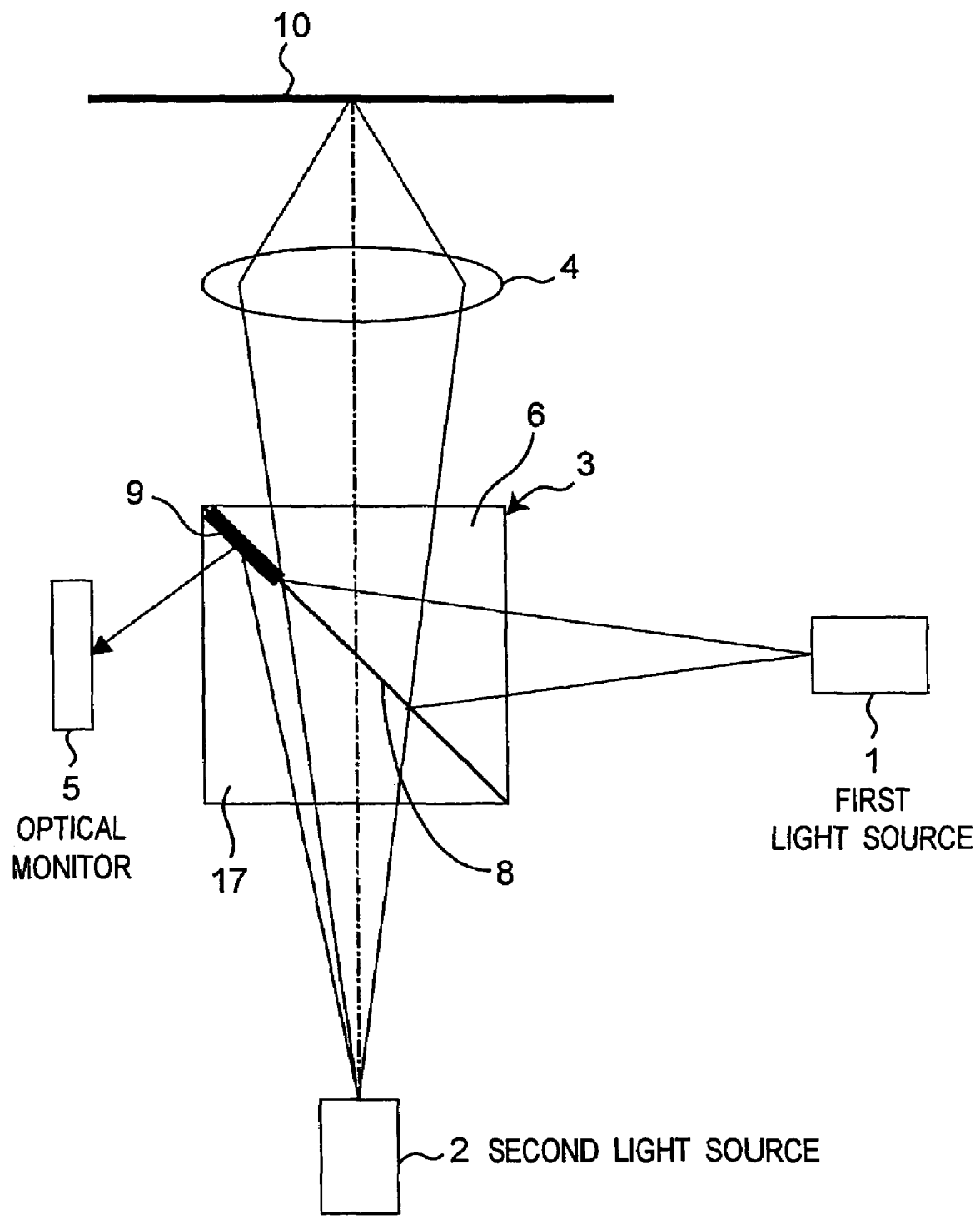
FIG. 1 is a schematic view of an optical pickup device according to a first embodiment of the present invention.

The present invention will be described in detail below on the basis of the embodiments shown in the drawings.

First Embodiment

FIG. 1 is a schematic view of the optical pickup device of the first embodiment. The optical pick-up device of the first embodiment has a first light source 1 that emits a first laser beam of a wavelength $\lambda 1$, a second light source 2 that emits a second laser beam of a wavelength $\lambda 2$, an optical separator 3, an object lens 4, an optical monitor 5 for the second light source and an automatic power control (APC) circuit (not shown).

The package for the first light source 1 contains an optical monitor (not shown) for the first light source that measures the quantity of light of the first light source 1.

The optical separator 3 is formed of a triangular prism 6, which is made of glass and located on the first light source 1 side, and a triangular prism 7, which is made of glass and located on the second light source 2 side. In detail, the optical separator 3 is formed by bonding one side surface of the triangular prism 6 located on the first light source side to one side surface of the second triangular prism 7 located on the second light source side with an adhesive.

A wavelength selecting film 8 is formed on the almost entire surface of the one side surface of the triangular prism 6. This wavelength selecting film 8 is designed so as to, on one hand, reflect approximately 100% of the first laser beam of the wavelength $\lambda 1$ emitted from the first light source 1 toward the object lens 4 and, on the other hand, transmit approximately 100% of the second laser beam of the wavelength $\lambda 2$ emitted from the second light source 2, in making the laser beams incident on the object lens 4.

On the other hand, a reflection film 9 as one example of the reflector is formed in a portion of the one side surface of the triangular prism 7, the portion being located on the object lens 4 side. The reflection film 9 is designed so as to reflect the second laser beam which is emitted from the second light source 2 and made incident on the reflection film 9, toward the second light source optical monitor 5. This reflection film 9 is constructed of a mirror having, at a surface, a metal deposition reflection coating of Al or the like, or a dielectric deposition reflection coating, which coatings have a high reflectance and are scarcely influenced even when the wavelength of the incident second laser beam fluctuates due to a temperature change or the like.

Figure 2:
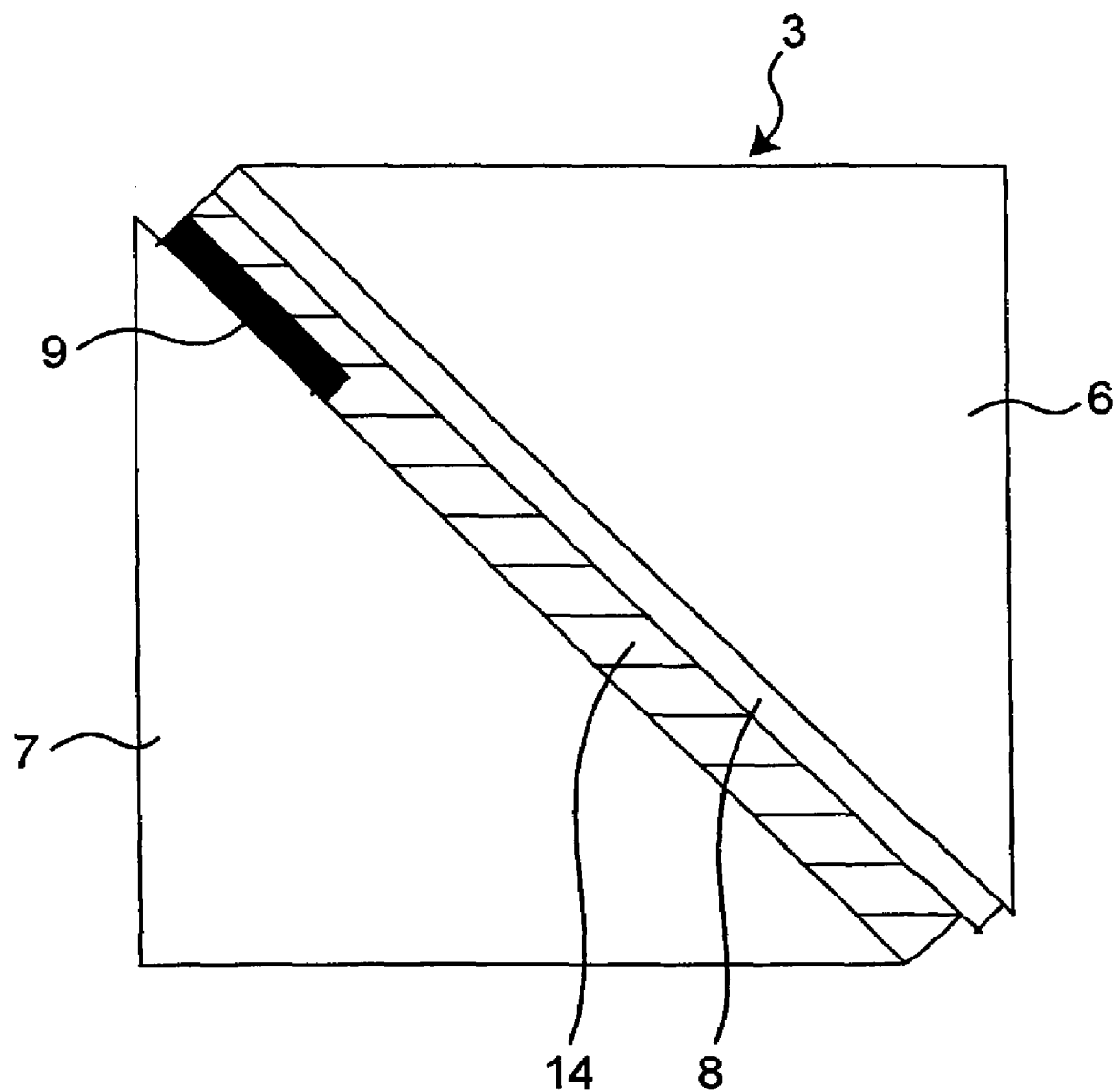
FIG. 2 is an enlarged view of bonding surfaces of two triangular prisms that constitute an optical separator included in the optical pickup device of the first embodiment.

FIG. 2 is an enlarged view of the neighborhood of the bonding surfaces of the triangular prism 6 and the triangular prism 7 in the optical separator 3.

As shown in FIG. 2, the wavelength selecting film 8 and the reflection film 9 are bonded together face to face via an adhesive 14. The wavelength selecting film 8 and the reflection film 9 are arranged so as not to be brought in direct contact with each other. Then, the reflection film 9 is arranged in a place where the film is brought in contact with neither of the first and second laser beams to be incident on the object lens 4 by way of the wavelength selecting film 8.

With the above-mentioned construction, when the data written on a loaded optical disk 10 (Note that in the description of the embodiments of the present invention, any optical disk is denoted by the same reference numeral 10 regardless of the optical disk type.) is read by the first laser beam of the wavelength $\lambda 1$ emitted from the first light source 1, the first laser beam emitted from the first light source 1 is reflected by the wavelength selecting film 8 toward the object lens 4 and thereafter concentrated on one point of the optical disk 10 by the object lens 4. Then, data (for example, pit information) of the optical disk 10 are extracted by a hologram element, a light-receiving element or the like (not shown) from the first laser beam that was reflected from the one point of the optical disk 10 and passed again through the object lens 4.

When data is written on a loaded optical disk 10 by the first laser beam of the wavelength $\lambda 1$ emitted from the first light source 1, the data write is performed by reflecting the first laser beam emitted from the first light source 1 by the wavelength selecting film 8 toward the object lens 4 and thereafter concentrating the laser beam on one point of the optical disk 10 by the object lens 4.

It is to be noted that the first light source 1 requires to be controlled such that the quantity of light emitted from the first light source 1 to write data to the optical disk 10 is normally greater than the quantity of light of the first light source 1 to read data from the optical disk 10. Therefore, the quantity of light of the first light source 1 is detected by the first light source optical monitor and thereafter converted into an electrical signal. This electrical signal is inputted to the automatic power control circuit (not shown) provided in the package of the optical pickup device or outside the package of the optical pickup device. Then, the optical output of the first light source 1 is controlled by feeding an output from this automatic power control circuit back to the first light source 1.

On the other hand, when data written on a loaded optical disk 10 is read by the second laser beam of the wavelength $\lambda 2$ emitted from the second light source 2, the second laser beam emitted from the second light source 2 is transmitted through the wavelength selecting film 8 and thereafter concentrated on one point of the optical disk 10 by the object lens 4. Then, the data written on the optical disk 10 is extracted by a hologram element, a light-receiving element or the like (not shown) from the second laser beam that was reflected from the one point of the optical disk 10 and passed again through the object lens 4.

When data is written on a loaded optical disk 10 by the second laser beam of the wavelength $\lambda 2$ emitted from the second light source 2, the data write is performed by transmitting the second laser beam emitted from the second light source 2 through the wavelength selecting film 8 and thereafter concentrating the laser beam on one point of the optical disk 10 by the object lens 4.

In the second light source 2, similarly to the first light source 1, it is necessary to control the quantity of light so as to be normally greater when data is written on the optical disk 10 than when data is read from the optical disk 10. Therefore, a peripheral portion of the second laser beam (namely, a second laser beam portion outside of the effective region), which was emitted from the second light source 2 and made incident on the reflection film 9, is reflected by the reflection film 9 toward the second light source optical monitor 5, and the quantity of light of the second laser beam incident on the second light source optical monitor 5 is detected. Thereafter, the light quantity, or intensity, of the second laser beam incident on the second light source optical monitor 5 is converted into an electrical signal, and this electrical signal is inputted to the automatic power control circuit. Then, the optical output of the second light source 2 is controlled by feeding the output from the automatic power control circuit back to the second light source 2.

According to the optical pickup device of the first embodiment, the reflection film 9 is arranged in the place where the film is brought in contact with neither of the first and second laser beams in an effective region to be incident on the object lens 4 by way of the wavelength selecting film 8. Therefore, the second laser beam in the effective region, which is emitted from the second light source 2 and made incident on the wavelength selecting film 8, can be substantially wholly transmitted toward the object lens 4. Because dissimilarly from the conventional optical pickup device, it is not required to reflect the second laser beam on the wavelength selecting film by several percent any more, the quantity of the second laser beam concentrated on the data recording surface of the optical disk 10 by the object lens 4 can be increased accordingly. Thus, the data reproducing capability and the data recording capability of the optical pickup device can be improved.

Moreover, before forming the optical separator 3 by bonding one side surface of the triangular prism 6 to one side surface of the triangular prism 7, it is possible to preparatorily provide the wavelength selecting film 8 on the triangular prism 6 and provide the reflection film 9 on the triangular prism 7. Therefore, the wavelength selecting film 8 and the reflection film 9 can be formed in different processes. Therefore, it is possible to avoid the problem which would occur when the wavelength selecting film is formed on one side surface of the triangular prism and subsequently the reflection film is formed on the wavelength selecting film, i.e., the problem that the wavelength selecting film is changed in quality by a stress applied to the wavelength selecting film in a vapor deposition process for forming the reflection film on the wavelength selecting film or the problem that the wavelength selecting film, a groundwork, is damaged by heat during the vapor deposition of the reflection film and/or the handling of the reflection film. Thus, the manufacturing yield of the prisms is improved and the manufacturing cost of the optical separator 3 is reduced.

Moreover, the optical characteristics of reflectance, transmittance and so on of the wavelength selecting film 8 depend on the refractive indices of the film composition of the wavelength selecting film 8 and of other members brought in contact with the film. Therefore, by placing the adhesive 14 between the wavelength selecting film 8 and the reflection film 9 so as not to bring the wavelength selecting film and the reflector in direct contact with each other, the optical characteristics of the wavelength selecting film 8 can be set independently of the reflection film 9 (not depending on the reflection film 9). Therefore, flexibility is provided in selecting the position and material of the reflection film 9 that reflects the second laser beam of the second light source 2 to the second light source monitor 5. As a result, flexibility is provided in selecting the arrangement position of the second light source optical monitor 5, and therefore, the optical pickup device can be downsized by effectively utilizing the above-mentioned selection flexibility.

Moreover, the wavelength selecting film 8 has reflectance of approximately 100% with respect to the first laser beam. Therefore, the first laser beam emitted from the first light source 1 and incident on the triangular prism 6 is reflected approximately 100% by the wavelength selecting film 8 arranged on the triangular prism 6. Therefore, the first laser beam emitted from the first light source 1 does not reach the reflection film 9 arranged on the side surface of the triangular prism 7 bonded to the triangular prism 6. Therefore, the first laser beam is not influenced by the reflection film 9, and further flexibility is provided in the formation position and material of the reflection film 9.

Moreover, the reflection film 9 is constructed of a mirror having, at a surface, a metal deposition reflection coating of Al or the like, or a dielectric deposition reflection coating, which coatings have a high reflectance and are scarcely influenced even when the wavelength of the incident second laser beam fluctuates due to a temperature change or the like. Therefore, the reflectance of the reflection film 9 is hardly influenced even if the wavelength of the second laser beam emitted from the second light source 2 is changed by a temperature change or the like. Therefore, the quantity of light of the second light source 2 can be accurately detected by the second light source optical monitor 5.

In the optical pickup device of the first embodiment, the optical separator 3 is formed by bonding the one side surface of the triangular prism 6 located on the first light source side to the one side surface of the triangular prism 7 located on the second light source 2 side. However, at least one of the triangular prisms may, of course, be replaced by a prism of another shape such as a pentaprism.

Second Embodiment

Figure 3:
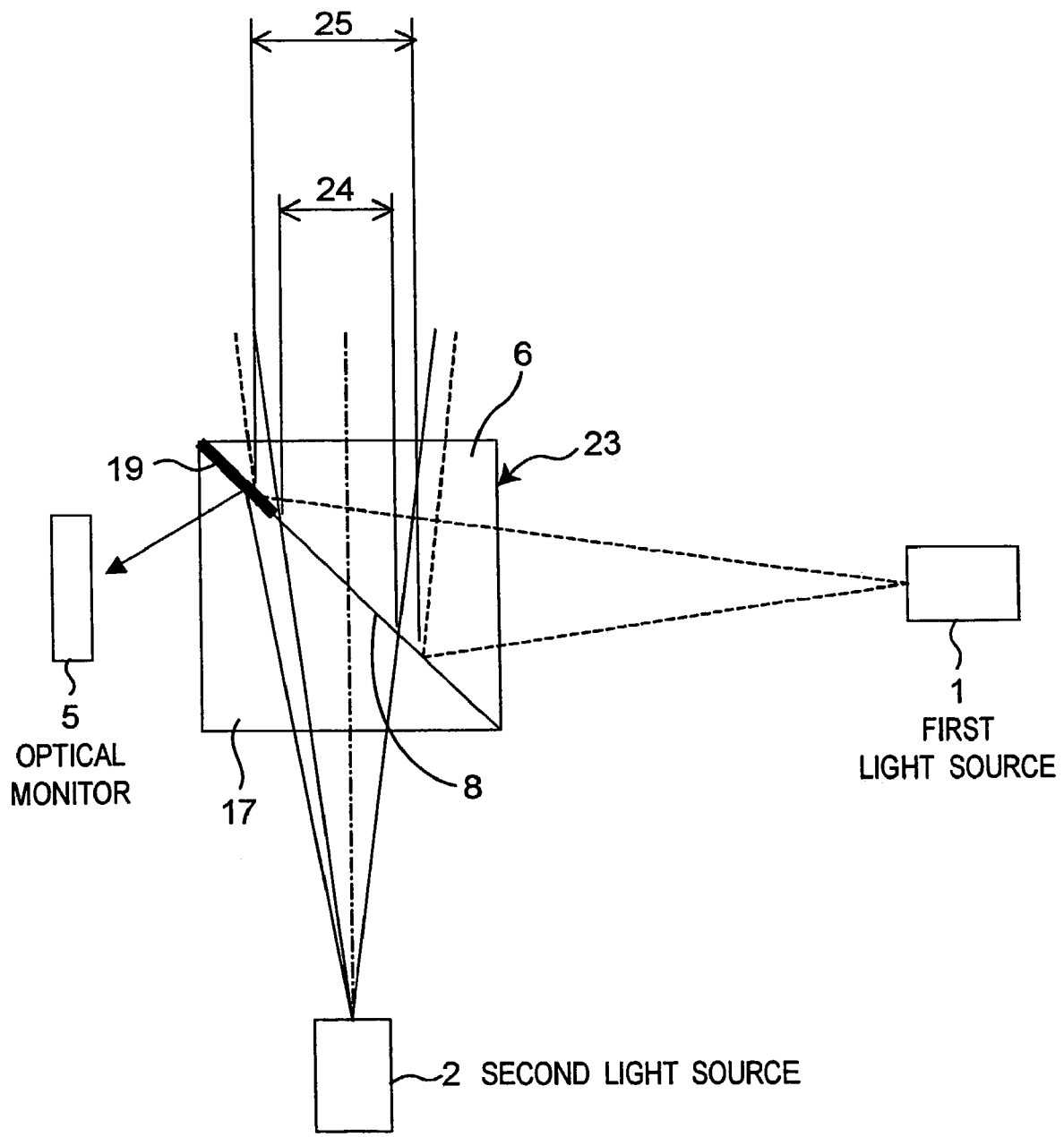
FIG. 3 is a schematic view of an optical pickup device according to a second embodiment of the present invention.

FIG. 3 is a schematic view of the optical pickup device of the second embodiment. The optical pickup device of the second embodiment differs from the optical pickup device of the first embodiment in that the area of the reflector (embodied as the reflection film 9 in the first embodiment) arranged on the side surface of the triangular prism 7 is increased, that the second light source 2 is put closer to the optical separator 3 in a direction perpendicular to the data recording surface of the optical disk (not shown), and that the reflector is constructed of a reflection type diffraction grating 19 instead of being constructed of a reflection film.

In the optical pickup device of the second embodiment, the same components as those of the optical pickup device of the first embodiment are denoted by the same reference numerals, and no description is provided therefor.

In the optical pickup device of this second embodiment, the second light source 2 is put closer to the optical separator 3 in the direction perpendicular to the data recording surface of the optical disk. Therefore, the luminous flux diameter 25 of the first laser beam incident on and reflected by the wavelength selecting film 8 to the object lens 4 becomes larger than the luminous flux diameter 24 of the second laser beam in the effective region transmitted through the wavelength selecting film 8 to the object lens 4.

According to the optical pickup device of the second embodiment, because the second light source 2 is put closer to the optical separator 23 in the direction perpendicular to the data recording surface of the optical disk so that the luminous flux diameter 24 is set smaller than the luminous flux diameter 25, the size of the reflection type diffraction grating 19 can be set large. Therefore, the quantity of light of the second laser beam incident on the second light source optical monitor 5 can be increased. Consequently, the signal-to-noise ratio of the signal outputted from the second light source optical monitor 5 can be improved, and the output of the second light source 2 can be accurately detected.

Moreover, the reflector is constructed of the reflection type diffraction grating 19, and therefore, the reflection angle of the second laser beam can be readily adjusted by changing the grating pitch. Therefore, flexibility is provided in selecting the arrangement or disposition of the optical components from the second light source 2 to the second light source optical monitor 5, and the optical pickup device can be made compact.

Although glass is used as the material of the optical separator 23 in the optical pickup device of the second embodiment, a resin material may be used as the material of the optical separator. In this case, the reflector can be formed easily and at low price merely by forming a reflection type diffraction grating on a mold for the optical separator. Therefore, mass productivity is improved and the cost of the optical pickup device can be reduced further than when the reflector is formed of a deposited film as in the optical pickup device of the first embodiment.

Moreover, the first laser beam from the first light source 1 is substantially totally reflected by the wavelength selecting film 8 similarly to the optical pickup device of the first embodiment. Therefore, even when the reflection type diffraction grating 19 is located in a position overlapping the luminous flux diameter 25, the first laser beam does not reach the reflection type diffraction grating 19. Therefore, the reflection type diffraction grating 19 may be arranged inside the luminous flux diameter 25 as far as the second laser beam in the effective region to enter the object lens 4 (not shown in FIG. 3) is not reflected by the diffraction grating 19.

Third Embodiment

Figure 4:
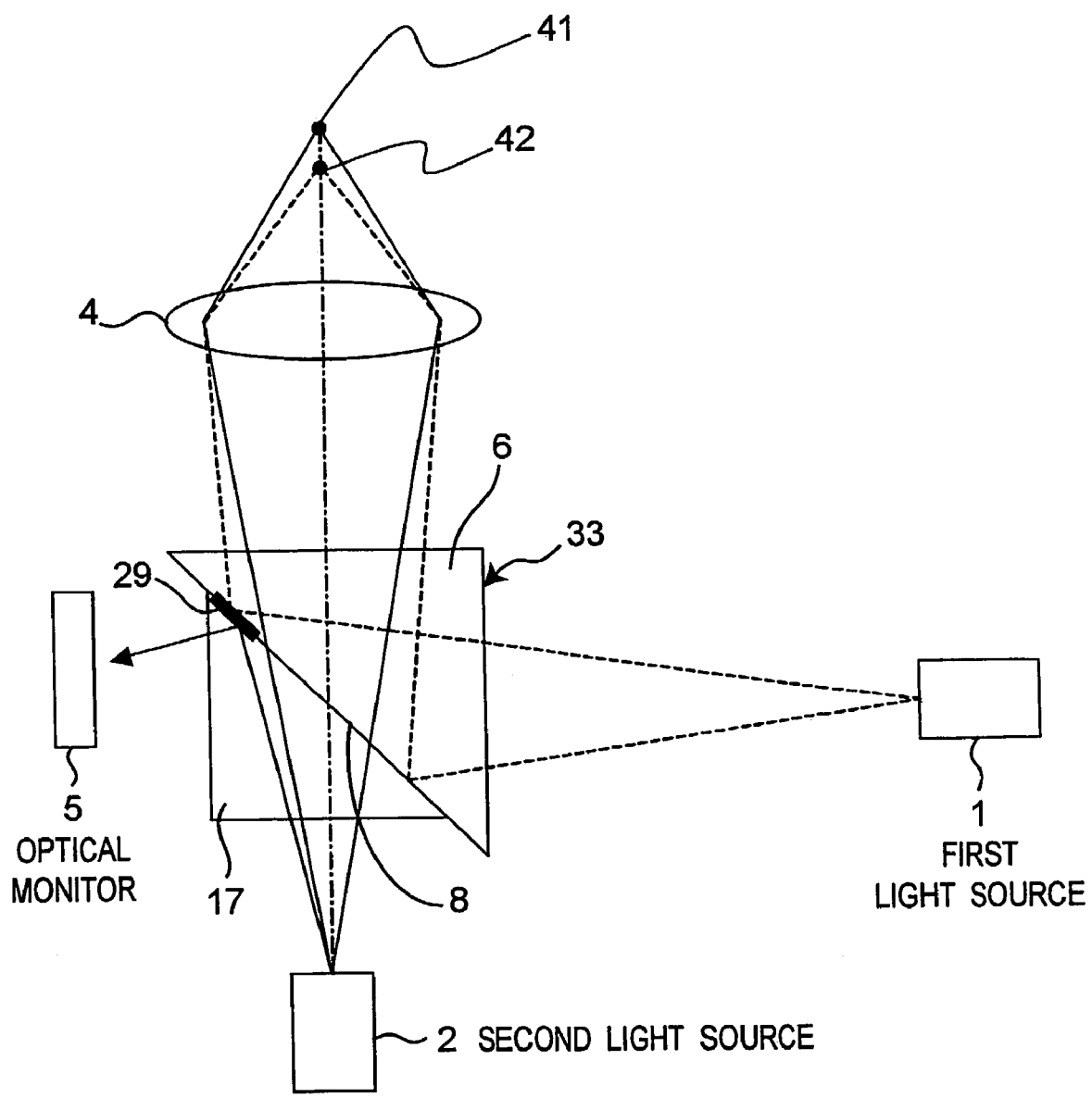
FIG. 4 is a schematic view of an optical pickup device according to a third embodiment of the present invention.

FIG. 4 is a schematic view of the optical pickup device of the third embodiment. The optical pickup device of the third embodiment differs from the optical pickup device of the second embodiment in that a triangular prism 17 located on the second light source 2 side is smaller, and that the second light source 2 is put closer to an optical separator 33 in the direction perpendicular to the data recording surface of the optical disk (not shown).

In the optical pickup device of the third embodiment, the same components as those of the optical pickup device of the second embodiment are denoted by the same reference numerals, and no description is provided therefor.

The optical separator 33 is provided in the optical paths of the divergent luminous flux of light emitted from the first light source 1 and the second light source 2.

In the above-mentioned construction, the first laser beam emitted from the first light source 1 is made incident on the triangular prism 6 of the optical separator 33, reflected by approximately 100% on the wavelength selecting film 8 and thereafter go out of the triangular prism 6 toward the object lens 4. That is, the first laser beam from the first light source 1 travels in the optical separator 33 by a distance corresponding to the size of the triangular prism 6.

On the other hand, the second laser beam emitted from the second light source 2 is made incident on the triangular prism 17 of the smaller size of the optical separator 33, transmitted through the wavelength selecting film 8 of the optical separator 33 and go out of the triangular prism 6 toward the object lens 4. That is, the second laser beam from the second light source 2 travels in the optical separator 33 by a distance corresponding to the sizes of the triangular prism 6 and the triangular prism 17.

According to the optical pickup device of the third embodiment, the triangular prism 17 that faces the second light source 2 is made small. Therefore, the second light source 2 can be shifted further to the object lens 4 side than the second light source 2 of the optical pickup device of the second embodiment. Therefore, the beam convergence point 41 of the second laser beam emitted from the second light source 2 by the operation of the object lens 4 can be located farther away from the optical separator 33 than a beam convergence point 42 of the first laser beam emitted from the first light source 1 by the operation of the object lens 4. Accordingly, even if there is a difference in thickness between the substrates of optical disks of two types (hereinafter referred to as a first optical disk and a second optical disk) used by the optical pickup device of the third embodiment, and a difference consequently occurs between a distance (assumed to be a first distance) from the object lens 4 to the first optical disk and a distance (assumed to be a second distance) from the object lens 4 to the second optical disk, the difference in the thickness between the substrates of the optical disks can be managed by adjusting the distance between the beam convergence points 41 and 42 to the difference in distance between the first distance and the second distance. Accordingly, it is not required to use the method of increasing the operating range of the object lens in managing the difference between the positions of the beam convergence points 41 and 42, and therefore, the optical pickup device can be constructed compact.

If the optical disks to be used by the optical pickup device of the third embodiment is a CD and a DVD, then the optical disks have a substrate thickness of 1.2 mm and 0.6 mm, respectively, and a difference of about 0.4 mm occurs in distance between the object lens 4 and each of the optical disks. In the above-mentioned case, by using the first light source 1 for the DVD and using the second light source 2 for the CD with the second light source 2 shifted toward the object lens 4, the beam convergence point 41 of the second laser beam emitted from the second light source 2 by the operation of the object lens 4 is located farther away from the optical separator 33 than the beam convergence point 42 of the first laser beam emitted from the first light source 1 by the operation of the object lens 4. With this arrangement, the difference of 0.4 mm between the distances from the object lens 4 and each of the optical disks is adjusted.

Moreover, according to the optical pickup device of the third embodiment, the triangular prism 17 located on the second light source 2 side is made small, and the arrangement position of the second light source 2 is shifted closer to the optical separator 33 side than the arrangement position of the second light source 2 of the optical pickup device of the second embodiment. Therefore, as compared with the optical pickup device of the second embodiment, the difference between the luminous flux diameter of the first laser beam incident on and reflected by the wavelength selecting film 8 to the object lens 4 and the luminous flux diameter of the second laser beam in the effective range transmitted through the wavelength selecting film 8 to the object lens 4 can be further increased. Therefore, the quantity of light of the second laser beam, which is emitted from the second light source 2 and made incident on the second light source optical monitor 5 is further increased to allow the signal-to-noise ratio of the output signal of the second light source optical monitor 5 to be improved. Therefore, the radiation output of the second light source 2 can be detected more accurately.

Moreover, the distance from the second light source 2 to the object lens 4 becomes shortened. Therefore, the optical pickup device can be made compact.

Fourth Embodiment

Figure 5:
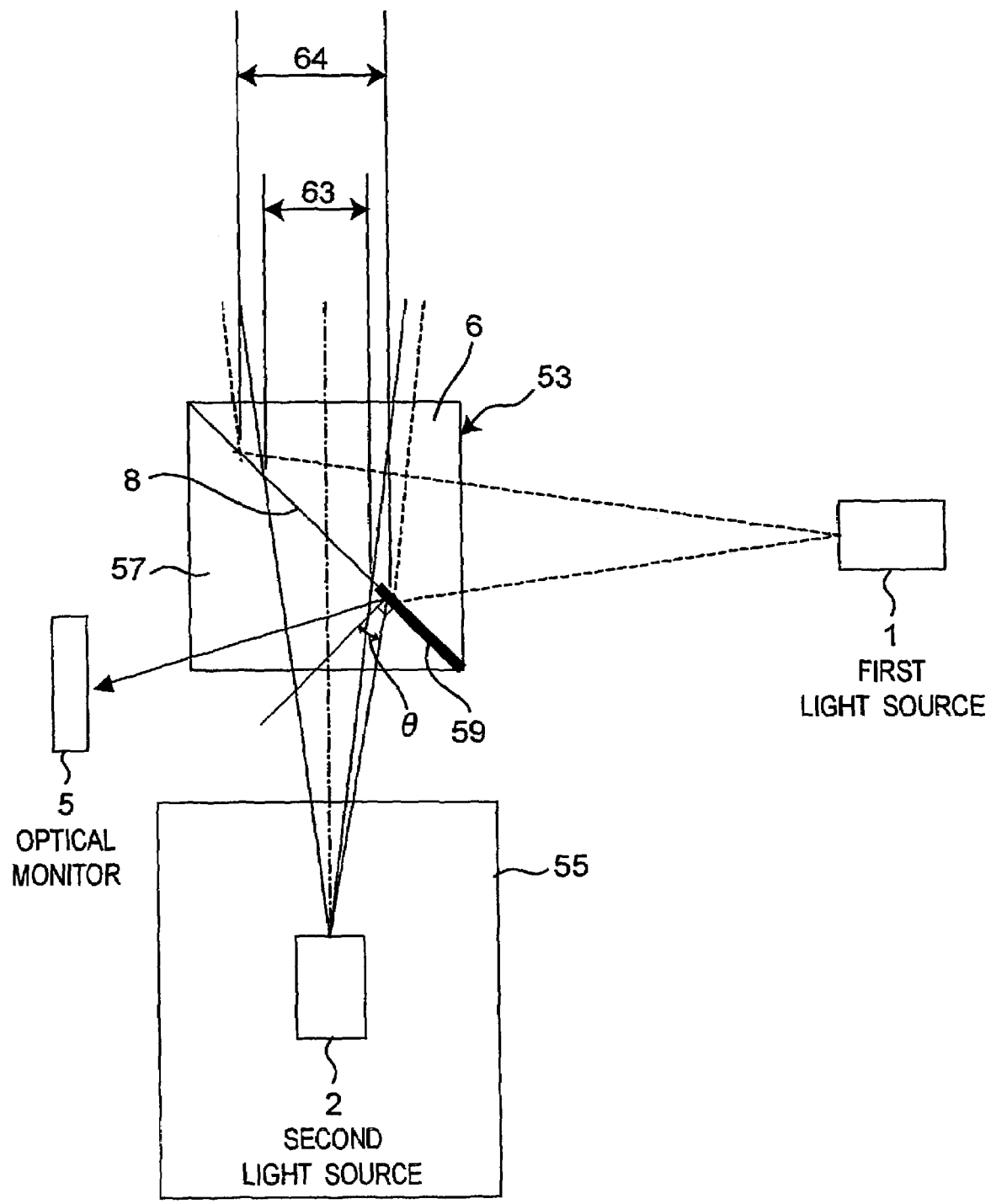
FIG. 5 is a schematic view of an optical pickup device according to a fourth embodiment of the present invention.

FIG. 5 is a schematic view of the optical pickup device of the fourth embodiment. In the optical pickup devices of the first embodiment through the third embodiment, the reflector is provided on the surface, which belongs to the triangular prism located on the second light source side and is bonded to the triangular prism located on the first light source side, in a location farther away from the second light source 2. However, in the optical pickup device of the fourth embodiment, the reflector is provided on a surface of a second light source-side triangular prism 57 to be bonded to the first light source-side triangular prism 6, in a location closer to the second light source 2. In the optical pickup device of this fourth embodiment, by intentionally providing the reflector on the side closer to the second light source 2, there will be described the problems when the reflector is provided on the side closer to the second light source 2 and the advantages when the reflector is provided on the side farther away from the second light source 2.

In the optical pickup device of the fourth embodiment, the same components as those of the optical pickup device of the third embodiment are denoted by the same reference numerals, and no description is provided therefor.

The reflector is a reflection film 59 made of the same material as that of the reflection film 9 employed in the first embodiment. Moreover, the reflection film 59 is provided on the side closer to the second light source 2, and the second laser beam emitted from the second light source 2 is guided to the second light source optical monitor 5.

However, in this case, the position of the second laser beam, which is emitted from the second light source 2 and made incident on the reflection film 59, is located near the second light source 2, and the incidence angle θ of the second laser beam with respect to the reflection film 59 becomes smaller than that of the optical pickup device of each of the first embodiment through the third embodiment. Therefore, the second light source optical sensor 5 must be provided in a position near the second light source 2. This fact means that, when a semiconductor laser is adopted as usual as the second light source 2, a package 55, which is made of a metal or the like and included in the semiconductor laser and covers the periphery of the semiconductor laser for the purpose of heat radiation and environment resistance is located adjacent to the second light source optical monitor 5 and it is difficult to downsize the optical pickup device.

Moreover, as shown in FIG. 5, it is also undesirable that the position of the second laser beam, which is emitted from the second light source 2 and reflected by the reflection film 59, going out of the triangular prism 57 located on the second light source 2 side becomes located near the apex corner of the triangular prism 57. The reason for the above is that, when the triangular prism located on the second light source side is made small as in the optical pickup device of the third embodiment, the second laser beam is scattered in the vicinity of the apex corner of the triangular prism located on the second light source side, and the quantity of light of the second laser beam incident on the second light source optical sensor 5 is reduced.

In order to eliminate the above-mentioned problems, the reflector is provided on the surface, which belongs to the triangular prism located on the second light source side and is bonded to the triangular prism located on the first light source side, farther away from the second light source, so that the distance between the second light source and the second light source optical monitor is increased to achieve the downsizing of the optical pickup device.

In FIG. 5, the reference numeral 63 denotes the luminous flux diameter of the second laser beam, which is emitted from the second light source 2, transmitted through the wavelength selecting film 8 and made incident on the object lens (not shown), in the incidence portion on the wavelength selecting film 8 with regard to its projection on the optical disk. The reference numeral 64 denotes the luminous flux diameter of the first laser beam, which is emitted from the first light source 1, reflected by the wavelength selecting film 8 and further made incident on the object lens, in the incidence portion on the wavelength selecting film 8 with regard to its projection on the optical disk.

Fifth Embodiment

Figure 6:
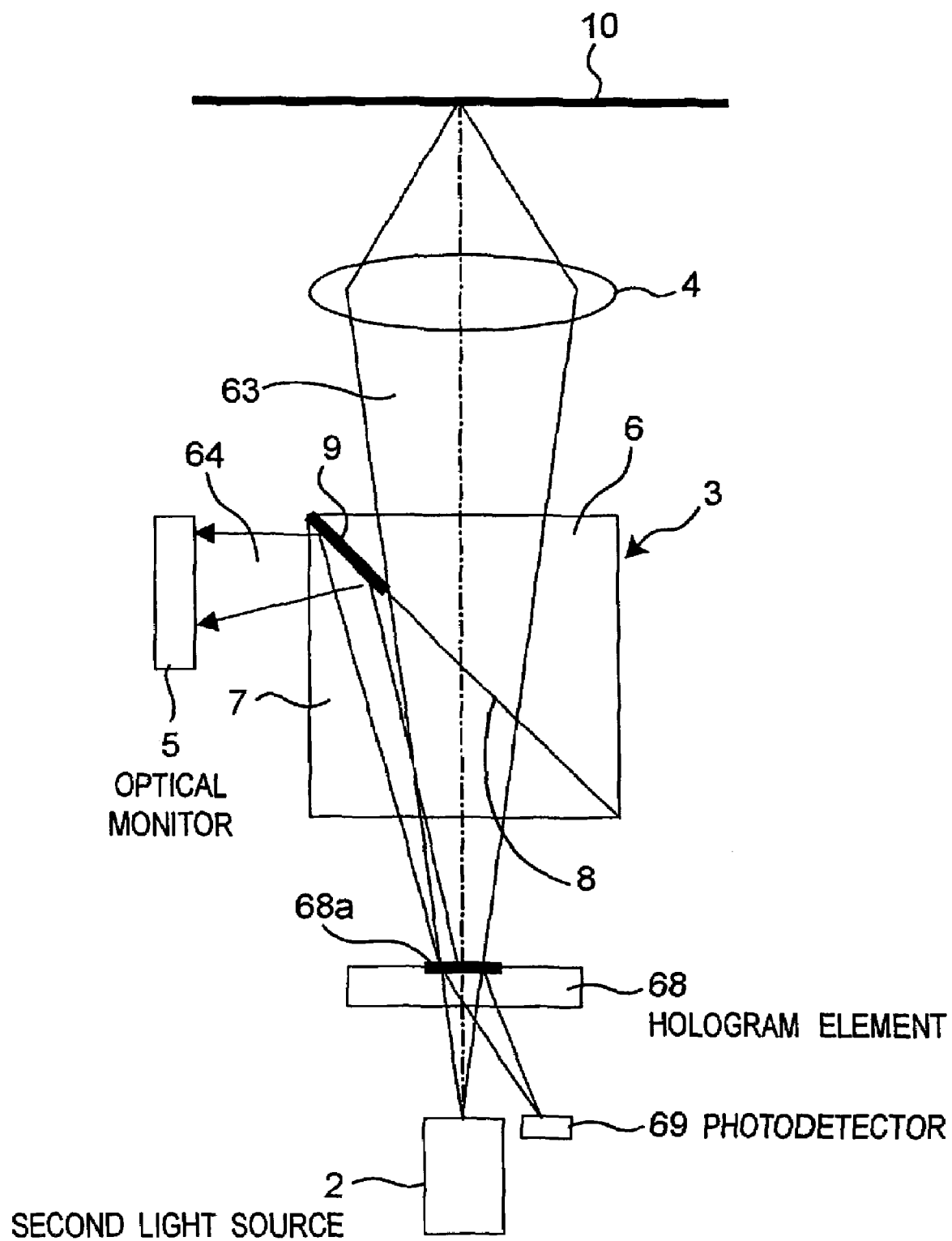
FIG. 6 is a schematic view of an optical pickup device according to a fifth embodiment of the present invention.

FIG. 6 is a schematic view of the optical pickup device of the fifth embodiment. The optical pickup device of the fifth embodiment differs from the optical pickup device of the first embodiment in that a hologram element 68 having a hologram pattern 68a is disposed between the second light source 2 and the optical separator 3 and that a photodetector 69 is provided for receiving the first and second laser beams reflected by an optical disk 10 and diffracted by the hologram element 68.

In the optical pickup device of the fifth embodiment, the same components as those of the optical pickup device of the first embodiment are denoted by the same reference numerals, and no description is provided therefor.

In the above-mentioned construction, zero-order light 63, which is emitted from the second light source 2, made incident on the hologram element 68 and is not diffracted by the hologram pattern 68a, forms a spot on the surface of the optical disk 10 by the object lens 4. Then, the zero-order light 63 reflected by this spot passes again through the object lens 4 and the optical separator 3 and is thereafter made incident on the hologram pattern 68a. Then, first-order diffracted light, which belongs to the zero-order light incident on the hologram pattern 68a and occurs in the hologram pattern 68a, is subjected to photoelectric conversion in the photodetector 69 to reproduce the data on the optical disk 10.

On the other hand, the diffracted light 64, which is emitted from the second light source 2, made incident on the hologram element 68 and diffracted by the hologram pattern 18a, is reflected by the reflection film 9 of the optical separator 3 and made incident on the second light source optical monitor 5.

According to the optical pickup device of the fifth embodiment, the diffracted light, which is emitted from the second light source and diffracted by the hologram element pattern 68a, is used as the second laser beam to be made incident on the reflection film 9 to detect the quantity of light of the second light source 2. Therefore, the laser beam, which belongs to the second laser beam emitted from the second light source 2 and is located in the vicinity of the center where intensity is higher, can be reflected by the reflection film 9 and guided to the second light source optical monitor 5. Therefore, the quantity of light emitted from the second light source 2 can be accurately detected by improving the signal-to-noise ratio of the signal outputted from the second light source optical monitor 5.

Moreover, the reflection film 9 is provided in the portion that faces the portion, which belongs to the wavelength selecting film 8 of the optical separator 3 and is located on the side farther away from the second light source 2, and the hologram element 68 is provided in addition. Therefore, the degree of separation of the diffracted light diffracted by the hologram pattern 18a from the zero-order light, which is not diffracted by the hologram pattern 18a, is increased. Therefore, by virtue of the synergistic effect of the provision of the reflection film 9 in the portion that faces the portion, which belongs to the wavelength selecting film 8 of the optical separator 3 and is located on the side farther away from the second light source 2, and the provision of the hologram element 68 between the second light source 2 and the optical separator 3, the second laser beam of the larger quantity of light can be guided to the second light source optical monitor 5.

Sixth Embodiment

Figure 7:
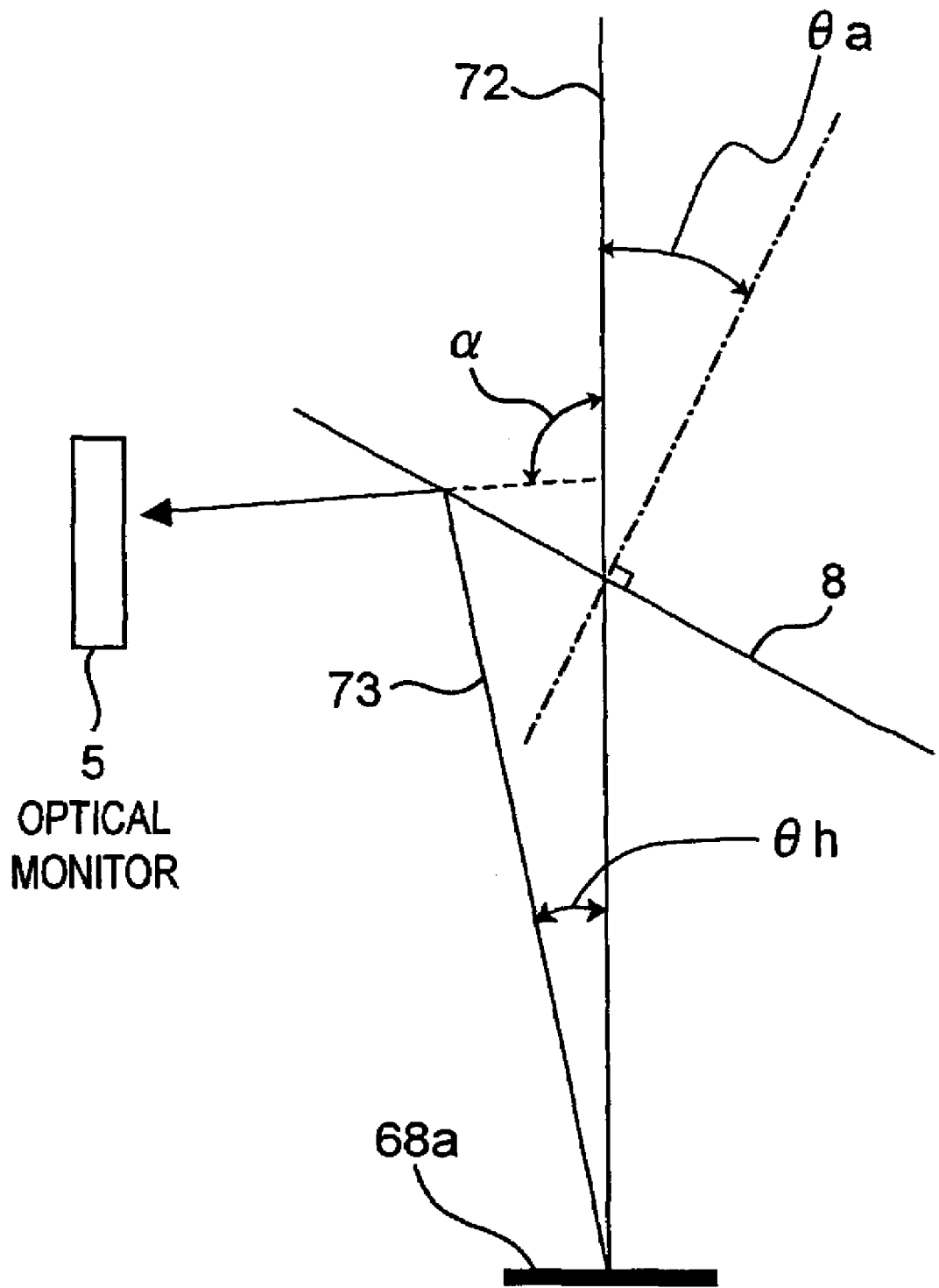
FIG. 7 is a schematic view of an optical pickup device according to a sixth embodiment of the present invention.

FIG. 7 is a schematic view of the optical pickup device of the sixth embodiment. The optical pickup device of the sixth embodiment differs from the optical pickup device of the fifth embodiment only in that, assuming that an angle made between an optical axis 72 of the zero-order light, which was emitted from the second light source (not shown) and travels in a straight line without being diffracted by the hologram pattern 68a, and the normal line of the wavelength selecting film 8 of the optical separator is θa and a diffraction angle of the first-order diffracted light 73 of the second laser beam, which was emitted from the second light source, diffracted by the hologram pattern 68a and is finally made incident on the second light source sensor 5, at the hologram pattern 68a is θh, then the condition:

$$2\theta a + \theta h \approx 90° \tag{1}$$

holds.

In the optical pickup device of the sixth embodiment, the same components as those of the optical pickup device of the fifth embodiment are denoted by the same reference numerals, and no description is provided therefor.

In the optical pickup device of the sixth embodiment, assuming that an angle made between the second laser beam reflected by the reflection film as the reflector and made incident on the second light source monitor 5 and the zero-order light emitted from the second light source and not diffracted by the hologram pattern 68a is α, then the relationship expressed by the equation (2):

$$\alpha = 180° - 2\theta a - \theta h \tag{2}$$

holds between α, θa and θh.

Therefore, in the optical pickup device of the sixth embodiment, from the equation (1) and the equation (2), the relation of the following equation (3):

$$\alpha \approx 90° \tag{3}$$

holds.

According to the optical pickup device of the sixth embodiment, the angle α made between the second laser beam reflected by the reflection film (not shown) and made incident on the second light source optical monitor 5 and the zero-order light emitted from the second light source and not diffracted by the hologram pattern 68a is set at approximately 90°. Therefore, the second laser beam can easily be made perpendicularly incident on the light-receiving surface of the second light source optical monitor 5. Therefore, the quantity of incident light of the second laser beam per unit area of the light-receiving surface can be maximized. Therefore, the signal-to-noise ratio of the signal outputted from the second light source optical monitor 5 can be improved, and the quantity of light of the second light source 2 can be accurately detected.

Moreover, by arranging the second light source optical monitor 5 parallel to the optical axis 72 of the zero-order light (center axis of the luminous flux of the zero-order light), flexibility is provided in the arrangement of the components inside the optical pickup device, and therefore, the downsizing of the optical pickup device can be achieved.

In the optical pickup device of the sixth embodiment, the angles θa and θh are set so as to satisfy the equation (1). However, it is acceptable to set the angles θa and θh so as to satisfy not only the equation (1) but also additional conditions of the following equations (4) and (5). In this case, the optical pickup device is allowed to have high quality.

$$30° \leq \theta a \leq 37° \tag{4}$$

$$11° \leq \theta h \leq 35° \tag{5}$$

In other words, by imposing the condition of the equation (5) to the angle θh, a balance can be struck between a requirement that the value of θh should be large from the viewpoint of preventing diffracted light, which is not the zero-order light, for writing data on an optical disk and/or reading data on the optical disk, from being applied to the optical disk and becoming an unnecessary stray light and a requirement that the value of θh should be small from the viewpoint of mass productivity requiring no miniaturization of the hologram pattern of the hologram element. Moreover, by imposing the condition of the equation (4) to the angle θa, a balance can also be struck among the condition that θa should be closer to 0° (i.e., a vertical incidence angle) to obtain a better wave surface of the first light beam reflected by the wavelength selecting film, the condition of equation (5), and the condition of equation (1). Therefore, the downsizing of the optical pickup device can be achieved.

Seventh Embodiment

Figure 8:
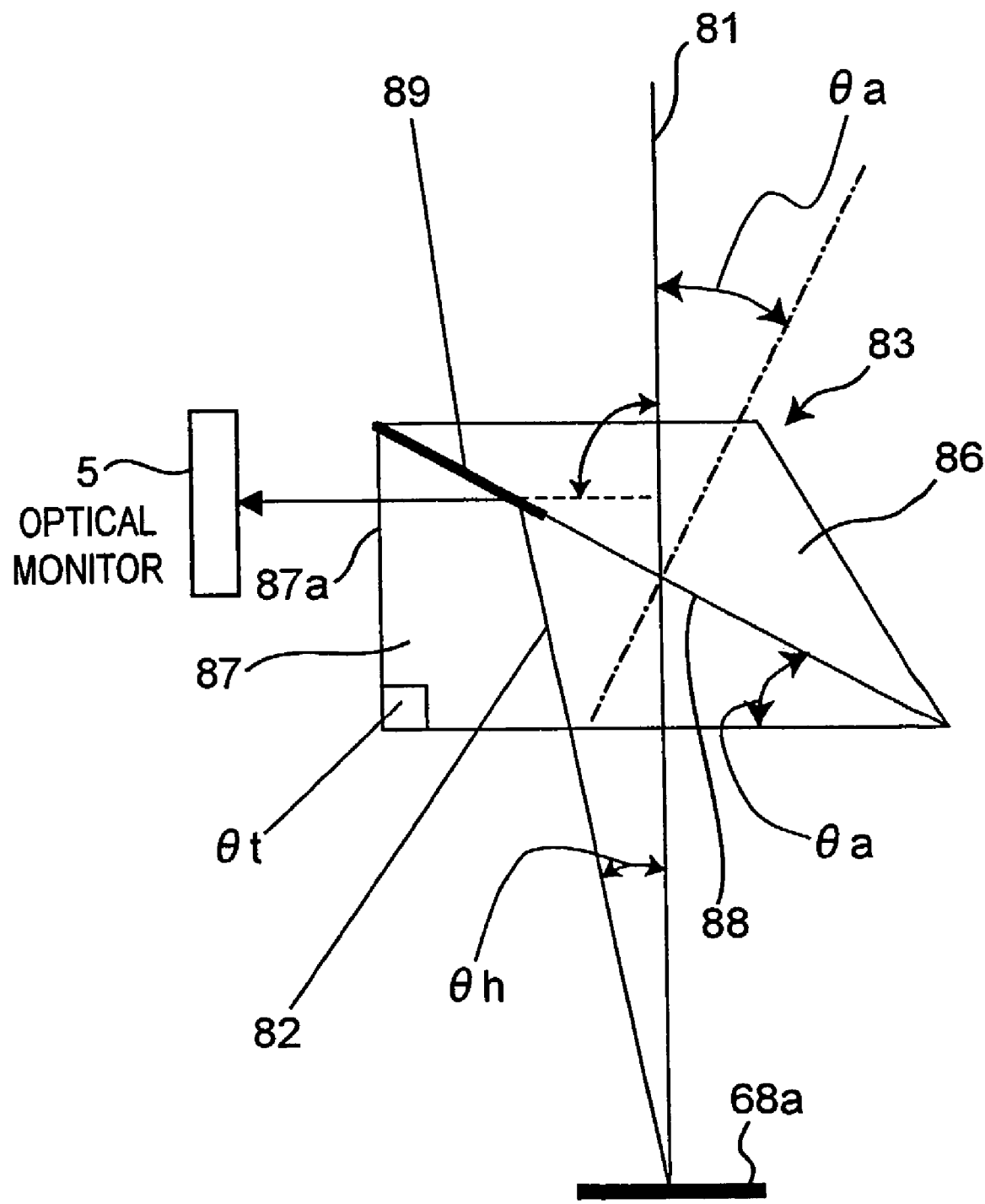
FIG. 8 is a schematic view of an optical pickup device according to a seventh embodiment of the present invention.

FIG. 8 is a schematic view of the optical pickup device of the seventh embodiment. The optical pickup device of the seventh embodiment differs from the optical pickup device of the sixth embodiment in that a triangular prism 86 located on the first light source (not shown) side and a triangular prism 87 located on the second light source (not shown) side, which constitute an optical separator 83, are configured largely differently from those of the optical separator in the sixth embodiment.

In detail, the triangular prism 87 located on the hologram pattern 68a side of the optical pickup device of the seventh embodiment is a rectangular prism (hereinafter, the rectangular prism is also denoted by the reference numeral 87) 87 of which the apex angle θt located on the second light source optical monitor 5 side and the hologram pattern 68a side is 90° and the other two angles are θa and (90°−θa). The triangular prism 86 has a side surface of an area equivalent to the area of a side surface which belongs to the rectangular prism 87 and is located opposite from the right-angled apex angle θt. By bonding this side surface of the triangular prism 86 to the side surface, which belongs to the rectangular prism 87 and is located opposite from the right-angled apex angle θt leaving no space between the surfaces, the optical separator 83 is formed.

In the optical pickup device of the seventh embodiment, the same components as those of the optical pickup device of the sixth embodiment are denoted by the same reference numerals, and no description is provided therefor.

A wavelength selecting film 88 made of the same material as that of the wavelength selecting film 8 of the first embodiment is formed on a side surface, which belongs to the triangular prism 86 and is bonded to the rectangular prism 87, and a reflection film 89 made of the same material as that of the reflection film 9 of the first embodiment is provided on a portion, which belongs to the wavelength selecting film 88 of the optical separator and is located on the side farther away from the second light source 2.

Moreover, similarly to the optical pickup device of the sixth embodiment, between the angle θa made between an optical axis 81 of zero-order light, which is emitted from the second light source (not shown) and travels in a straight line without being diffracted by the hologram pattern 68a and the normal line of the wavelength selecting film 88 of the optical separator (not shown) and the diffraction angle θh of first-order diffracted light 82 of the second laser beam, which is emitted from the second light source 2, diffracted by the hologram pattern 68a and finally made incident on the second light source optical monitor 5 in the hologram pattern 68a, there holds the condition (2θa+θh≈90°) of the equation (1).

A side surface 87a, which belongs to the triangular prism 87 and is located on the second light source optical monitor 5 side, is formed of a frosted glass-like surface as one example of the light scattering surface. This frosted glass-like side surface 87a plays the role of scattering a trace quantity of the second laser beam, which is not transmitted through this side surface 87a, after reflection on the reflection film 89. Moreover, the side surface 87a located on the second light source optical monitor 5 side is subjected to an anti-reflection coating (AR coating) process for restraining the reflection of the second laser beam on this side surface 87a.

According to the optical pickup device of the seventh embodiment, the triangular prism located on the hologram pattern 68a side is the rectangular prism 87 that can easily be processed and is suitable for mass production, and therefore, the cost can be reduced.

Moreover, the triangular prism located on the hologram pattern 68a side is the rectangular prism 87. Therefore, the direction of the second laser beam, which is emitted from the second light source (not shown), diffracted by the hologram pattern 68a and further reflected by the reflection film 89, is allowed to coincide with the normal line direction of the side surface 87a located on the second light source optical monitor side. Therefore, the second light beam is not refracted by this side surface 87a. Accordingly, it is not required to take the deviation of the second laser beam due to refraction into consideration with regard to the arrangement of the second light source optical monitor 5, and the design of the optical pickup device can be simplified.

Moreover, the side surface 87a located on the second light source optical monitor side is a frosted glass-like surface that has undergone the anti-reflection coating process as one example of the light scattering surface. Therefore, a trace quantity of the second laser beam, which is reflected by the reflection film 89 and thereafter not transmitted through the side surface 87a that has undergone the anti-reflection coating process, can be scattered and diffused. Therefore, the phenomenon that the second laser beam, which is reflected by the side surface 87a normally with a reflectance of about 0.5 to 1% even when the anti-reflection coating (AR coating) is provided, returns to the optical system roughly reversely through the path of incidence on the side surface 87a and becomes a stray light can be prevented. This prevents the degradation in the recording and reproducing characteristics of the optical disk and allows the optical pickup device operation to be stabilized. In the optical pickup device of the seventh embodiment, the condition of the equation (1) holds, and the prism located on the side surface 87a side is the rectangular prism 87. Therefore, the second laser beam is to be made roughly perpendicularly incident on the side surface 87a.

Moreover, the side surface 87a of the rectangular prism 87 is the frosted glass-like surface. Therefore, the triangular prism 87 can be manufactured at low price, and the mass productivity of the triangular prism 87 can be further improved.

In the optical pickup device of the seventh embodiment, the side surface 87a located on the second light source optical monitor side is the frosted glass-like surface that has undergone the anti-reflection coating process in order to restrain the second laser beam reflected by the side surface 87a from becoming stray light. However, the side surface located on the second light source sensor side may be left as a cut surface through the process of cutting out the rectangular prism from a glass substrate. Moreover, it is not required to provide the anti-reflection coating depending on the degree of the effect of scattering.

Eighth Embodiment

Figure 9:
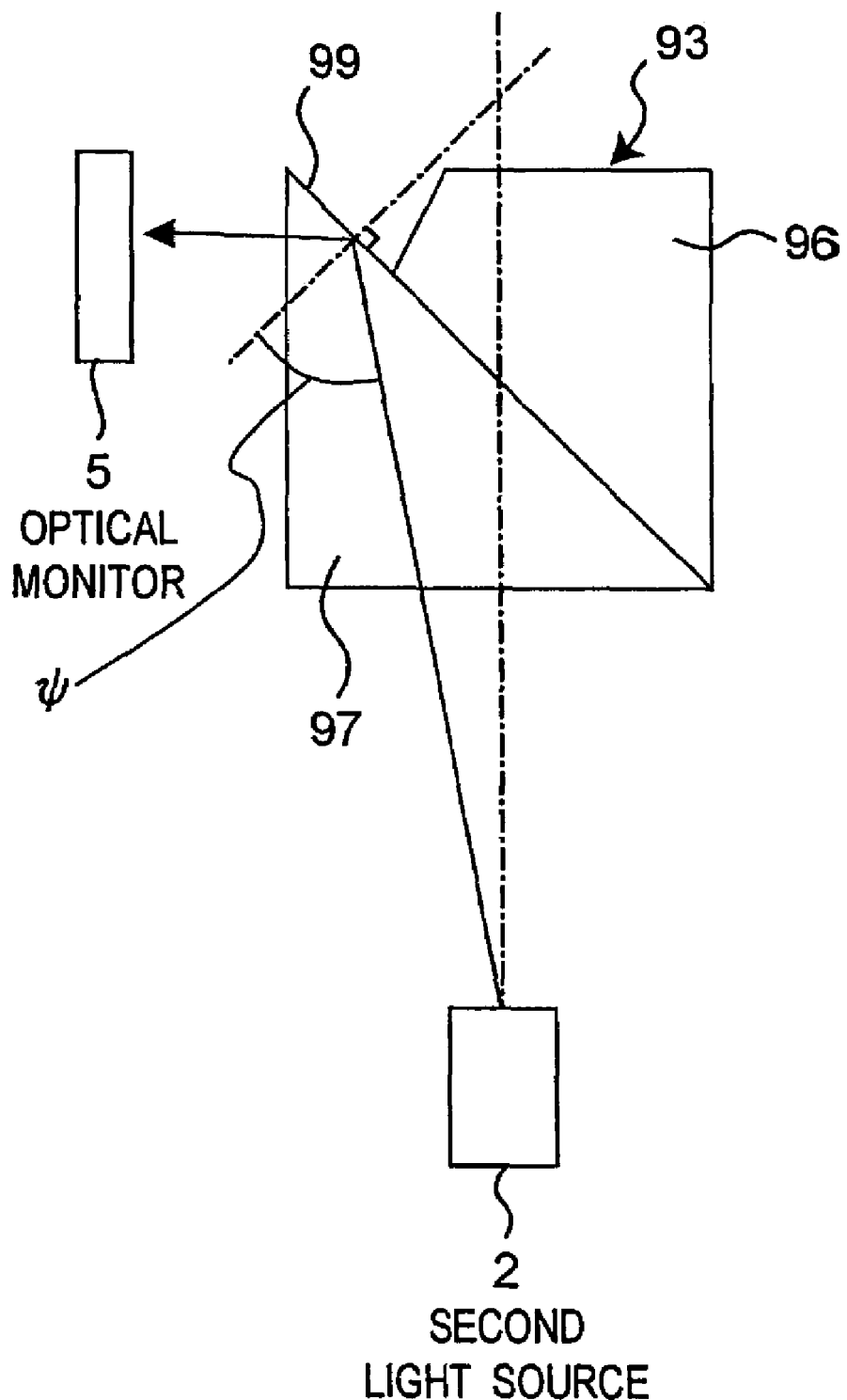
FIG. 9 is a schematic view of an optical pickup device according to an eighth embodiment of the present invention.

FIG. 9 is a schematic view of the optical pickup device of the eighth embodiment. The optical pickup device of the eighth embodiment differs from the optical pickup device of the first embodiment essentially in that a prism 96 on the first light source (not shown) side is formed by cutting off a corner portion facing the reflection film 9 of the triangular prism in the first embodiment, to expose a part of a surface of a triangular prism 97 on the second light source 2 side and that this exposed surface is a reflection surface 99 as one example of the reflector (as well as in the wavelength selecting film has a smaller area in the eighth embodiment).

In the optical pickup device of the eighth embodiment, the same components as those of the optical pickup device of the first embodiment are denoted by the same reference numerals, and no description is provided therefor.

In the optical pickup device of the eighth embodiment, assuming that the incidence angle of the second laser beam, which is emitted from the second light source 2, reflected by a reflection surface 99 and made incident on the light-receiving surface of the second light source optical monitor 5 with respect to the reflection surface 99 is ψ, and the refractive index of a triangular prism 97 located on the second light source 2 side is n, then there holds the following equation (6) according to which the reflection surface 99 becomes a total reflection surface.

$$n \times \sin \psi \geq 1 \qquad (6)$$

According to the optical pickup device of the eighth embodiment, the reflector of the prism 96 located on the first light source side can be formed by merely cutting off one corner portion of a triangular prism, and it is not required to provide a reflector of a complicated structure, such as a mirror that has a surface on which a metal deposition reflection coating obtained by depositing a metal of Al or the like is deposited, a mirror that has a surface on which a dielectric deposition reflection coating obtained by depositing a dielectric substance is deposited or a reflection type diffraction grating on the triangular prism located on the second light source side. Therefore, an optical separator 93 having excellent mass productivity can be manufactured at low price.

Moreover, the condition of the equation (6) is attached, the reflectance can be theoretically made to be 100%. Therefore, in comparison with the case where a deposited reflection coating or a reflection type diffraction grating is employed, a larger quantity of light can be guided to the second light source optical monitor 5, and the signal-to-noise ratio of the output signal of the second light source optical monitor 5 can be improved.

Ninth Embodiment

Figure 10:
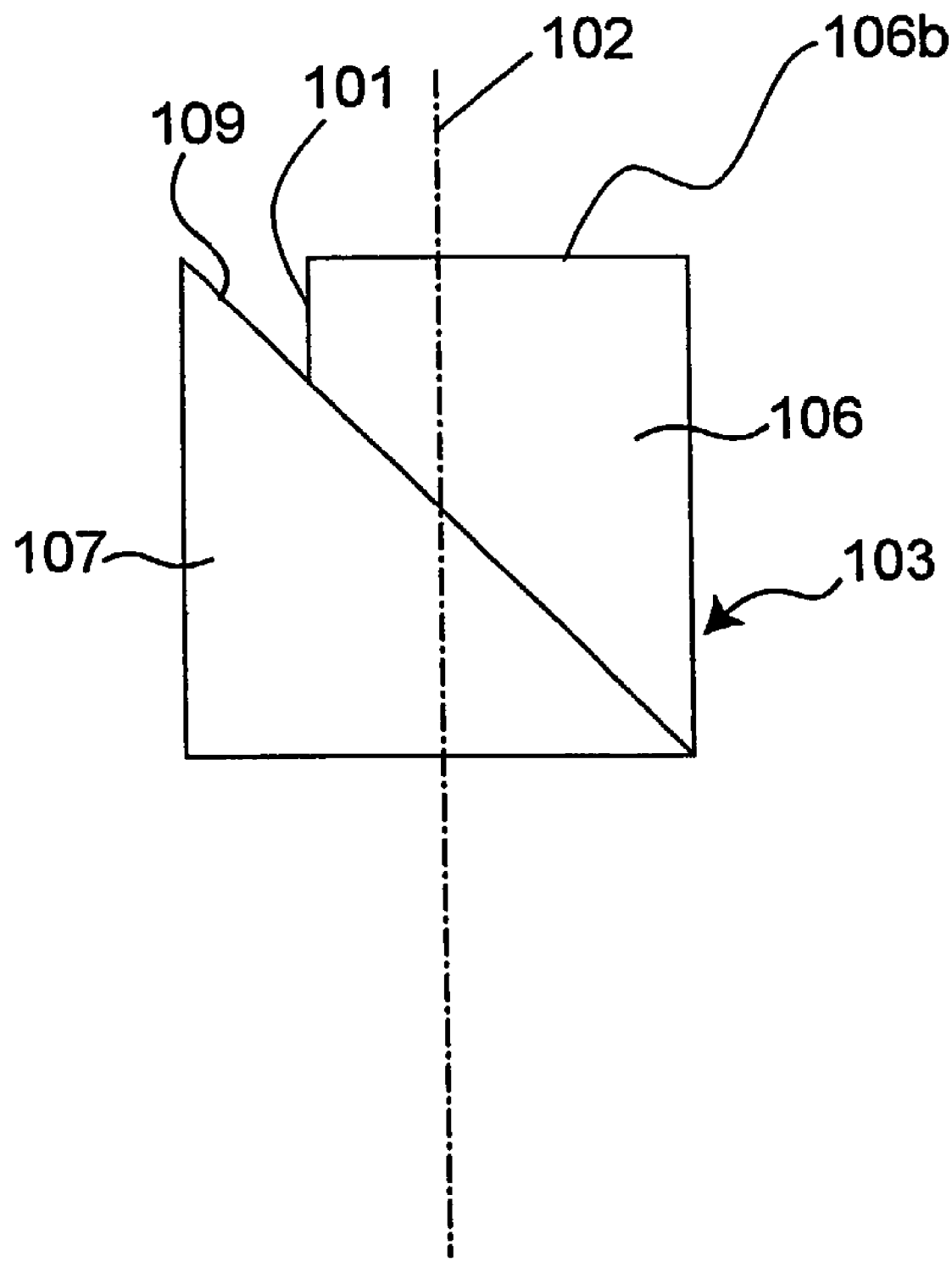
FIG. 10 is a sectional view of an optical separator included in an optical pickup device according to a ninth embodiment of the present invention.

FIG. 10 is a sectional view of an optical separator included in the optical pickup device of the ninth embodiment. The optical pickup device of the ninth embodiment is similar to the optical pickup device of the eighth embodiment in that a corner portion, on the second laser beam monitor side, of a triangular prism is cut off into a prism 106 located on the first light source (not shown) side. The point of difference from the optical pickup device of the eighth embodiment is that the cut surface 101 is roughly parallel to the optical axis 102 of the second laser beam, which is emitted from the second light source (not shown) and made incident on an object lens (not shown) (in this case, a state in which the cut surface 101 and the optical axis 102 do not intersect each other is referred to as parallel).

According to the optical pickup device of the ninth embodiment, the cut surface 101 is arranged parallel to the optical axis 102. Therefore, it is possible to increase the area of a first and second laser beam emitting surface 106b of the prism 106, located on the object lens (not shown) side, where the first and second laser beams are emitted. Therefore, it is possible to restrain scattering of the first laser beam, which would otherwise occur at the first and second laser beam emitting surface 106b. Accordingly, the first and second laser beams can reliably be made incident on the object lens, and the data reproducing capability and the data recording capability of the optical disk (not shown) can be improved.

Moreover, the cut surface 101 is arranged parallel to the optical axis 102. Therefore, the area of the reflection surface 109 as one example of the reflector can be increased, and the quantity of light of the second laser beam made incident on the second light source optical monitor (not shown) can be increased.

Tenth Embodiment

Figure 11:
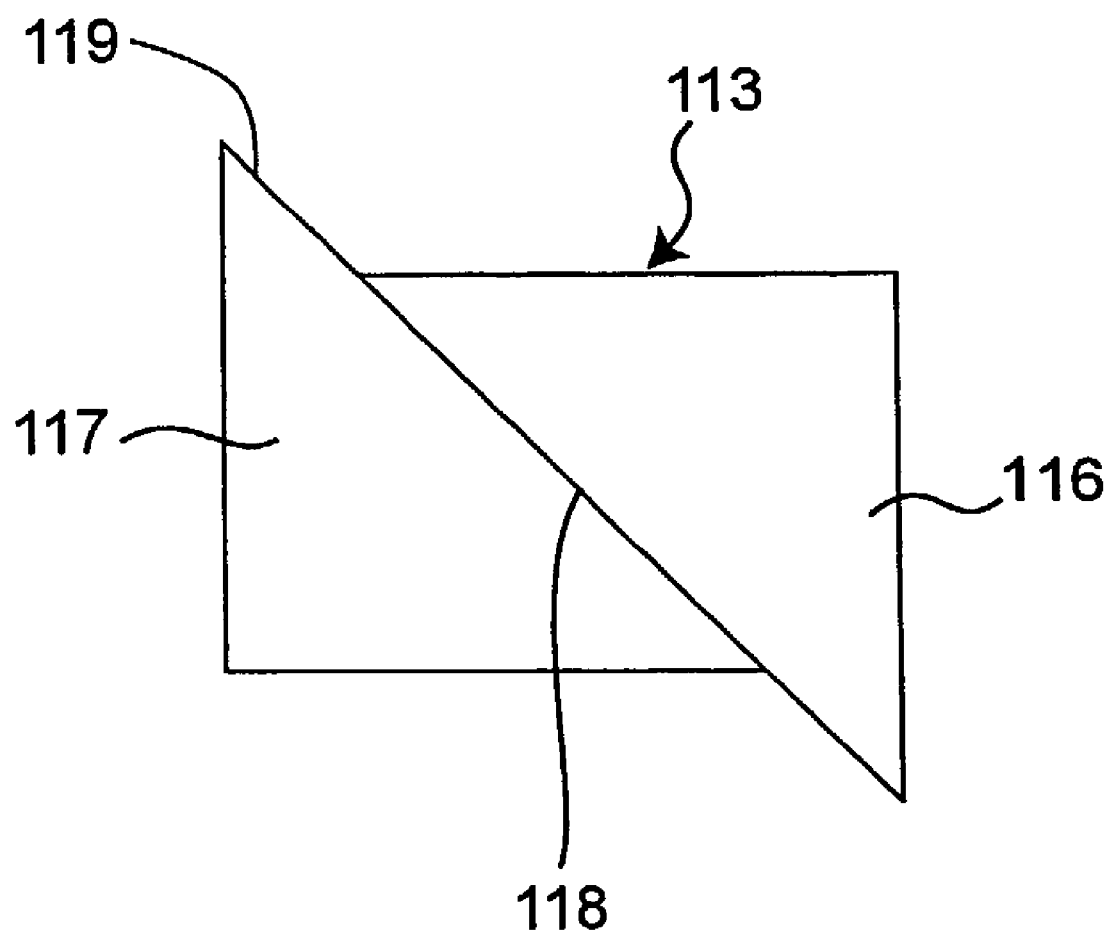
FIG. 11 is a sectional view of an optical separator included in an optical pickup device according to a tenth embodiment of the present invention.

FIG. 11 is a sectional view of an optical separator included in the optical pickup device of the tenth embodiment. An optical separator 113 is formed by bonding together two similar triangular prisms, namely a triangular prism 116 located on the first light source (not shown) side and a triangular prism 117 located on the second light source (not shown) side with the triangular prism 116 displaced toward the second light source in such a manner that their end surfaces do not generate a stepped portion. A wavelength selecting film 118 is formed on the entire side surface of the triangular prism 116, which surface has a portion to be bonded to the triangular prism 117 located on the second light source (not shown) side. A noncontact portion of a side surface of the triangular prism 117 to be bonded to the triangular prism 116 constitutes a reflection surface 119 as one example of the reflector. The noncontact portion is located on the object lens (not shown) side and on the second light source optical sensor (not shown) side and not brought in contact with the triangular prism 116.

According to the optical pickup device of the tenth embodiment, it is not required to subject the triangular prism located on the first or second light source side to a cutting process dissimilarly to the optical pickup devices of the eighth and ninth embodiments, and therefore, the cost can be reduced.

Eleventh Embodiment

Figure 12:
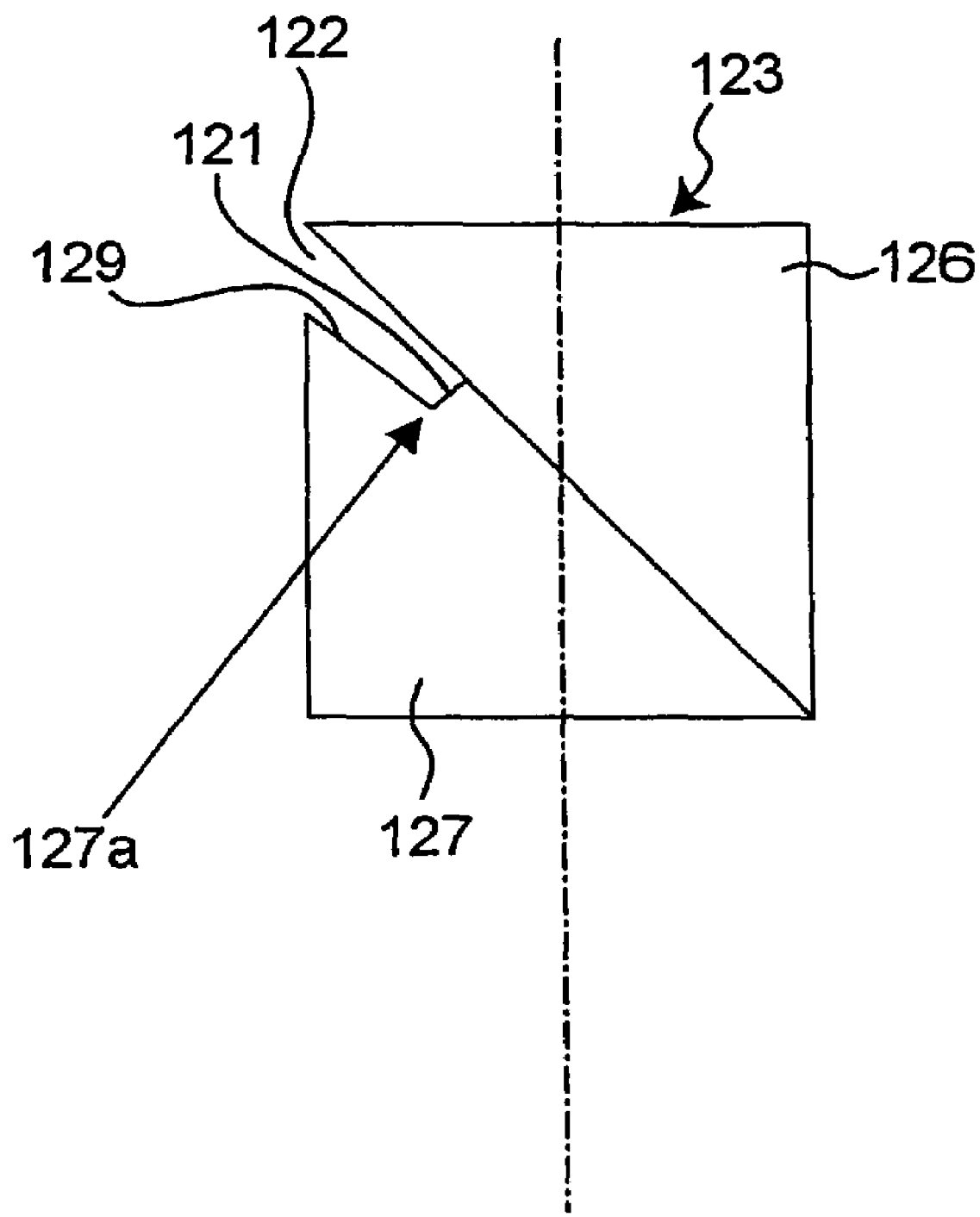
FIG. 12 is a sectional view of an optical separator included in an optical pickup device according to an eleventh embodiment of the present invention.

FIG. 12 is a sectional view of an optical separator included in the optical pickup device of the eleventh embodiment. This optical separator 123 is formed by bonding a part of one side surface of a triangular prism 126 arranged on the first light source (not shown) side to one side surface of a prism 127 arranged on the second light source (not shown) side.

The prism 127 has a configuration such that an end portion of one side surface of a triangular prism is cut off. The prism 127 has a stepped portion 121 that continues to a surface bonded to the triangular prism 126 and a surface 129 as one example of the noncontact surface that is not brought in contact with the triangular prism 126 that continues to this stepped portion 121. This surface 129 is a reflection surface (hereinafter, this reflection surface is also denoted by the reference numeral 129) as one example of the reflector. A groove 122 is formed in a portion, which belongs to a bonding surface of the triangular prism 126 and the prism 127 of an optical separator 123 and is located adjacent to the end located on the object lens side (not shown).

Also, in the optical pickup device of the eleventh embodiment, similarly to the optical pickup device of the eighth embodiment, assuming that the incidence angle of the second laser beam, which is emitted from the second light source, reflected by a reflection surface 129 and made incident on the light-receiving surface of the second light source optical monitor (not shown) with respect to the reflection surface 129 is ψ, and the refractive index of a prism 127 is n, then there holds the relation (n×sin ψ≧1) of the equation (6) according to which the reflection surface 129 becomes a total reflection surface.

According to the optical pickup device of the eleventh embodiment, the reflection surface 129 of the prism 127 is formed by cutting off the end portion of one side surface of the triangular prism, and therefore, the aforementioned angle ψ can easily be adjusted by adjusting the portion to be cut off. Therefore, the second light source optical monitor, which is not shown in FIG. 12, can be arranged in a place convenient for the downsizing of the optical pickup device.

Twelfth Embodiment

Figure 13:
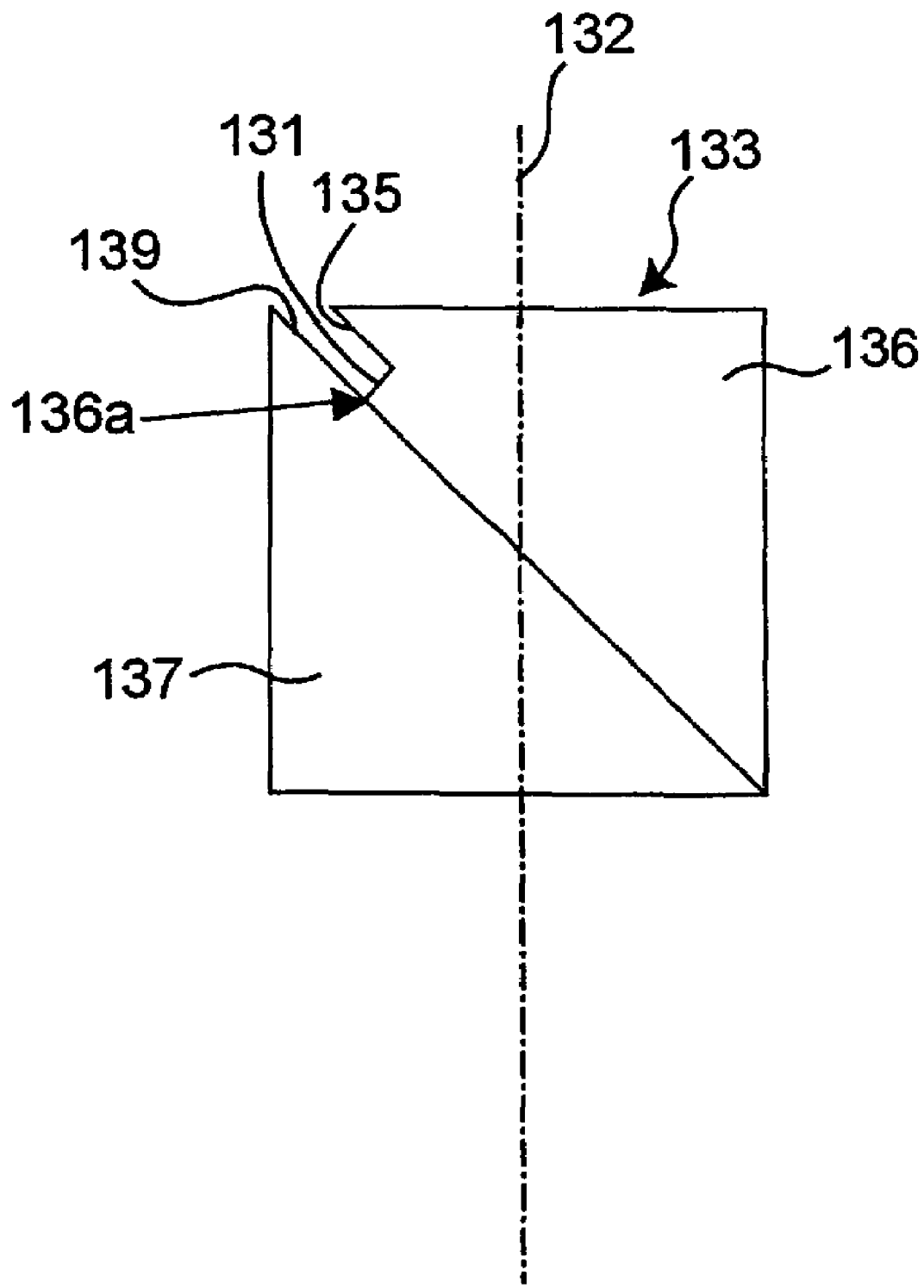
FIG. 13 is a sectional view of an optical separator included in an optical pickup device according to a twelfth embodiment of the present invention.

FIG. 13 is a sectional view of an optical separator included in the optical pickup device of the twelfth embodiment. This optical separator 133 is formed by bonding a portion of one side surface of a prism 136 arranged on the first light source (not shown) side to one side surface of a triangular prism 137 arranged on the second light source (not shown) side.

According to the optical separator 133 included in the optical pickup device of the twelfth embodiment, the substantial point of difference is that a prism 136 located on the first light source side has a configuration such that the end portion of one side surface of a triangular prism is cut off, dissimilarly to the optical separator 123 included in the optical pickup device of the eleventh embodiment in which the prism 127 (see FIG. 12) located on the second light source side has a configuration such that the end portion of one side surface of a triangular prism is cut off.

In FIG. 13, the reference numeral 131 denotes a stepped portion that continues to the bonding surface of the prism 136 and a triangular prism 137, while the reference numeral 135 denotes a noncontact surface, which belongs to the prism 136, continues to the stepped portion 131 and is not brought in contact with the triangular prism 137.

On the other hand, the reference numeral 139 denotes a surface, which belongs to the triangular prism 137 that faces the noncontact surface 135 and is not brought in contact with the prism 136, the surface being a reflection surface as one example of the reflector.

According to the optical pickup device of the twelfth embodiment, the prism 136 located on the first light source side is formed by cutting off the end portion of one side surface of a triangular prism. Therefore, an edge 136a, which belongs to the stepped portion 131 and is located on the second light source (not shown) side, does not scatter the laser beam dissimilarly to the edge 127a of the stepped portion 121 of the optical separator 123 included in the optical pickup device of the eleventh embodiment. Therefore, the laser beam scattered by the edge 127a does not become stray light dissimilarly to the optical pickup device of the eleventh embodiment.

Thirteenth Embodiment

Figure 14:
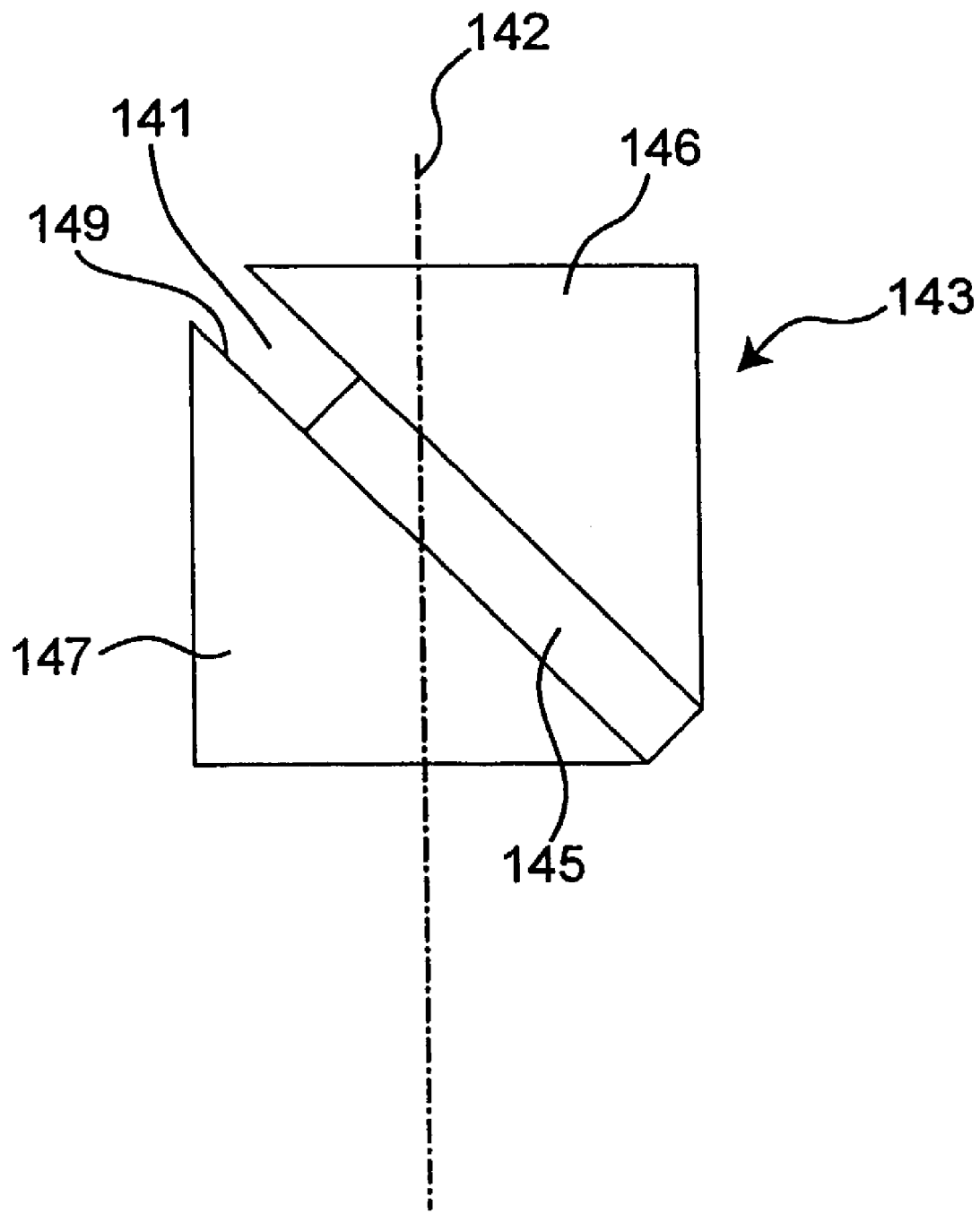
FIG. 14 is a sectional view of an optical separator included in an optical pickup device according to a thirteenth embodiment of the present invention.

FIG. 14 is a sectional view of an optical separator included in the optical pickup device of the thirteenth embodiment. This optical separator 143 is formed by bonding a portion of one side surface of a triangular prism 146 arranged on the first light source (not shown) side to a portion of one side surface of a triangular prism 147 arranged on the second light source (not shown) side with an adhesive. An adhesive layer formed of an adhesive 145 has a thickness of several microns to several tens of microns.

A wavelength selecting film (not shown) is formed on the bonding surface of the triangular prism 146 and the triangular prism 147.

An end surface, which belongs to the adhesive layer and is located on the object lens (not shown) side, serves as a bottom surface of a groove 141. A side surface 149 located on the triangular prism 147 side of the groove 141 is a reflection surface as one example of the reflector.

According to the optical pickup device of the thirteenth embodiment, it is not required to subject the triangular prisms 127 and 136 to the cutting process in forming the optical separators 123 and 133 dissimilarly to the optical pickup devices of the eleventh and twelfth embodiments, and therefore, the optical separator 143 can be manufactured simply at low price.

Fourteenth Embodiment

Figure 15:
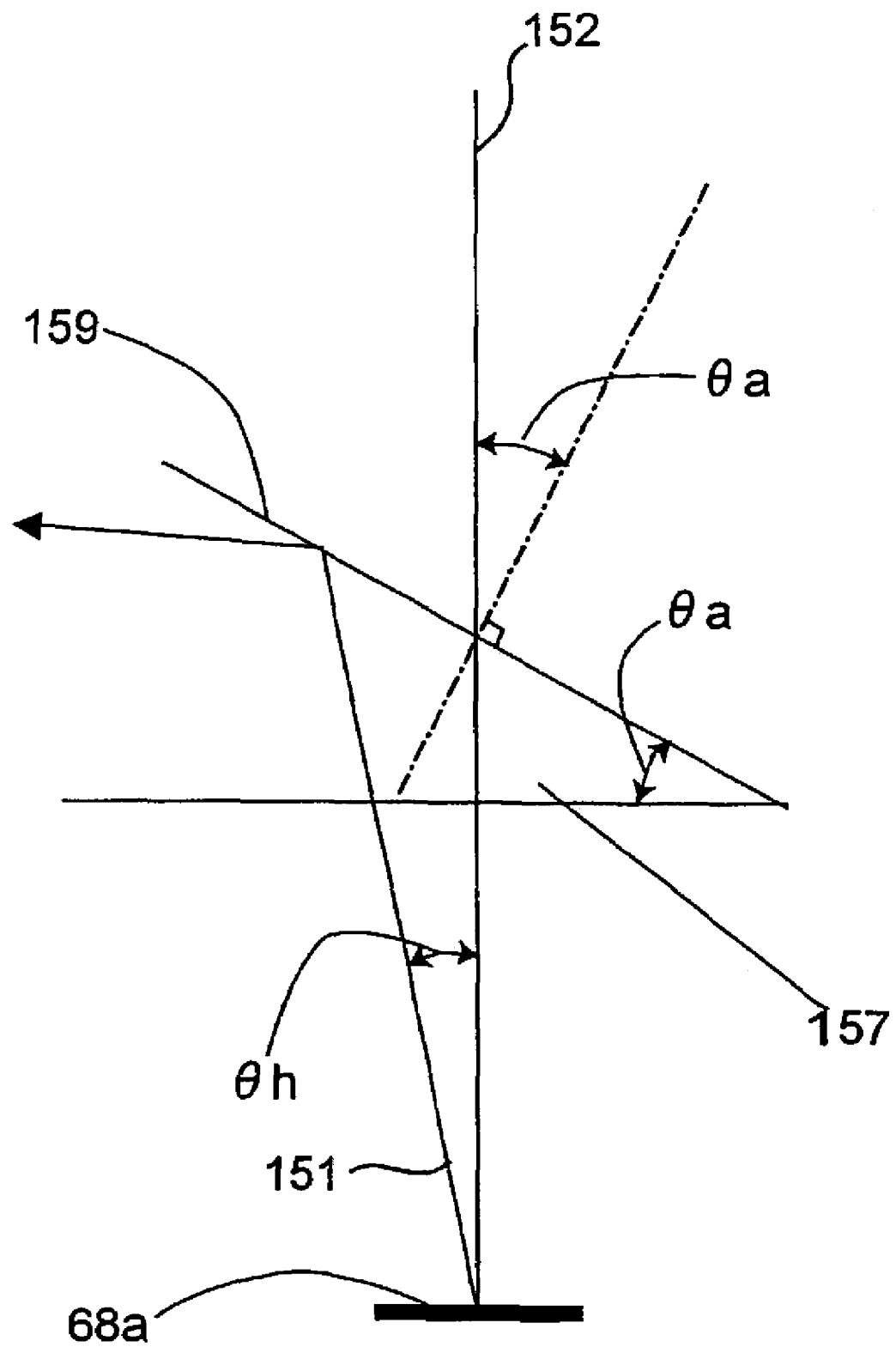
FIG. 15 is a schematic view of an optical pickup device according to a fourteenth embodiment of the present invention.

FIG. 15 is a schematic view of the optical pickup device of the fourteenth embodiment. The optical pickup device of the fourteenth embodiment differs from the optical pickup device of the fifth embodiment essentially in that no reflection film is provided, that a triangular prism 157 located on the second light source (not shown) side and a triangular prism (not shown) located on the first light source (not shown) side are bonded together while being displaced from each other as shown in FIG. 11, and that, assuming that the refractive index of the triangular prism 157 located on the second light source side is n, an inclination between the normal line of a bonding surface of the first light source-side triangular prism to be bonded to the triangular prism 157 and the optical axis (center axis of the luminous flux) 152 of the second laser beam, which has not been diffracted by the hologram pattern 68a, is θa, and the diffraction angle of the first-order diffracted light 151 of the second laser beam, which was emitted from the second light source (not shown) and primarily diffracted by the hologram pattern 68a is θh (the diffracted light 151 will be further reflected by the noncontact portion of the surface bonded to the triangular prism 157 and made incident on the second light source optical monitor, then there holds the relation of the following equation (7) between the angles θh and θa.

$$n \times \sin(\theta a + (\sin^{-1}(\sin \theta h/n))) \geq 1 \quad (7)$$

The equation (7) is the condition that first-order diffracted light 151 of the second laser beam diffracted by the hologram pattern 68a is totally reflected by the noncontact portion 159 as one example of the noncontact surface of the triangular prism located on the first light source side of the triangular prism 157. In the optical pickup device of the fourteenth embodiment, the noncontact portion 159 is one example of the reflector.

In the optical pickup device of the fourteenth embodiment, the same components as those of the optical pickup device of the fifth embodiment are denoted by the same reference numerals, and no description is provided therefor.

In the above-mentioned construction, the first-order diffracted light 151, which is emitted from the second light source and diffracted by the hologram pattern 68a, is totally reflected by the noncontact portion 159 and made incident on the second light source optical monitor (not shown).

According to the optical pickup device of the fourteenth embodiment, the relation of the equation (7) is attached to the relation between n, θh and θa, the first-order diffracted light 151 diffracted by the hologram pattern 68a of the second laser beam can be reflected by approximately 100% on the noncontact portion 159. Therefore, the quantity of light of the second laser beam incident on the second light source optical monitor can be increased.

Fifteenth Embodiment

Figure 16:
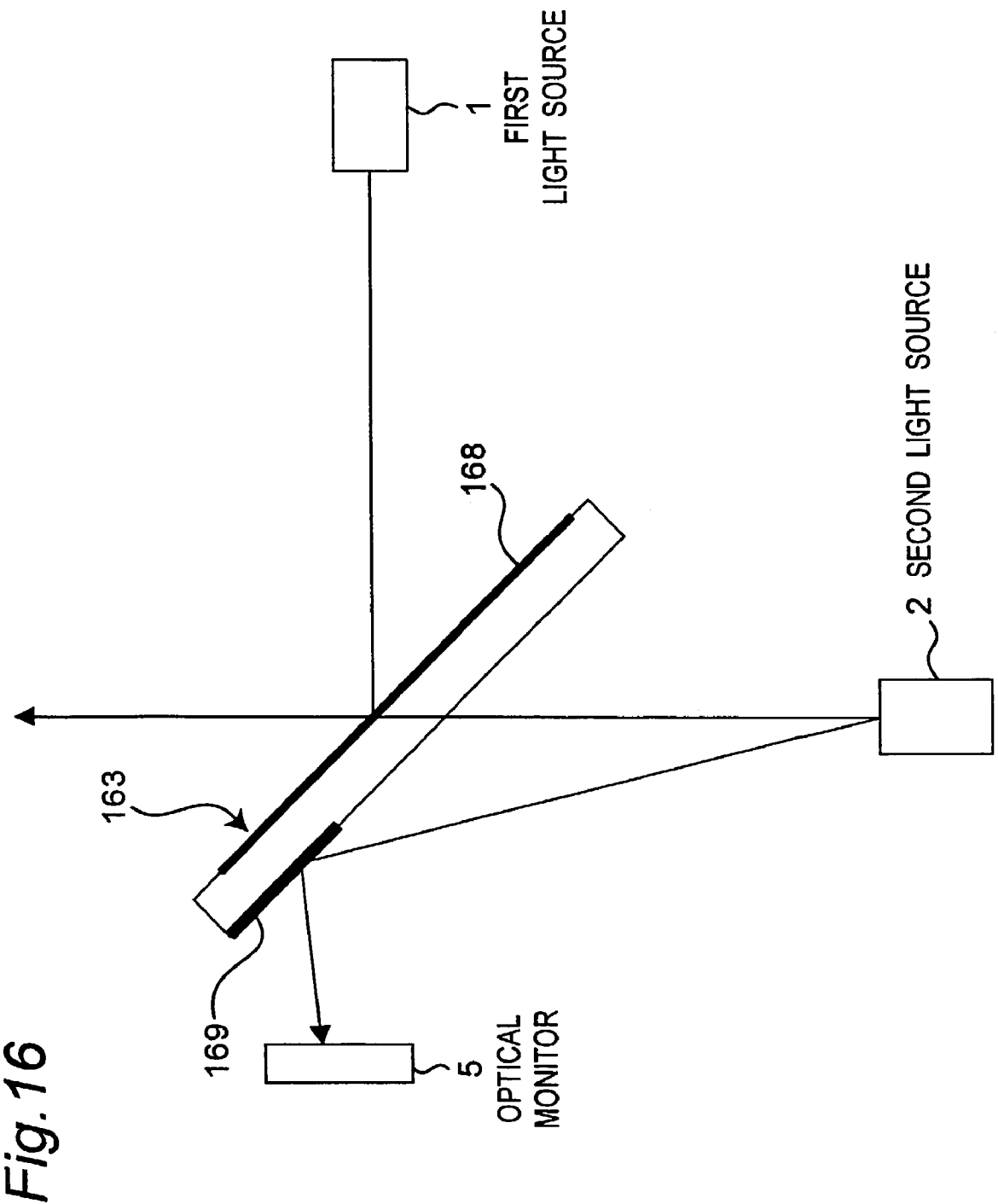
FIG. 16 is a schematic view of an optical pickup device according to a fifteenth embodiment of the present invention.

FIG. 16 is a schematic view of the optical pickup device of the fifteenth embodiment. The optical pickup device of the fifteenth embodiment differs from the optical pickup device of the first embodiment only in that an optical separator 163 is formed by processing a parallel plate type transparent integrated member such as a synthetic quartz or BK-7 instead of forming the optical separator by bonding two triangular prisms together.

In the optical pickup device of the fifteenth embodiment, the same components as those of the optical pickup device of the first embodiment are denoted by the same reference numerals, and no description is provided therefor.

A wavelength selecting film 168 is formed by vapor deposition on a surface, which belongs to the optical separator 163 and faces the first light source 1. This wavelength selecting film is designed to roughly totally reflect the first laser beam of the wavelength θ1 emitted from the first light source 1 and roughly transmits the second laser beam of the wavelength θ2 incident from the second light source 2.

Moreover, a reflection film 169 as one example of the reflector is formed in a portion, which belongs to the optical separator 163 and is located near the object lens (not shown) of a surface that faces the second light source 2.

The reflection film 169 is formed of a mirror, which is obtained by depositing a metal such as Al or a dielectric substance and the reflectance of which is not influenced even when the wavelength of the second laser beam emitted from the second light source 2 fluctuates due to a temperature change or the like.

According to the optical pickup device of the fifteenth embodiment, the wavelength selecting film 168 is provided on the surface, which belongs to the parallel plate type optical separator 163 and faces the first light source 1, and the reflection film 169 is provided on the surface, which belongs to the parallel plate type optical separator 163 and faces the second light source. Therefore, similarly to the case where the optical separator is formed of two different members, the wavelength selecting film 168 and the reflection film 169 can be formed through different processes. Therefore, similarly to the case where the optical separator is formed of two different members, the problem caused in the case of forming the wavelength selecting film on one side surface of the triangular prism and thereafter forming the reflection film on the wavelength selecting film, i.e., the problem that the wavelength selecting film is changed in quality by applying a film stress to the wavelength selecting film of the groundwork in the vapor deposition process for forming the reflection film or the problem that the wavelength selecting film of the groundwork is damaged by heat during the vapor deposition of the reflection film or by the handling work can be avoided, allowing the manufacturing yield of the transparent integrated member to be improved and allowing the manufacturing cost of the optical separator to be reduced.

Moreover, since the optical separator 163 is formed of the parallel plate type transparent integrated member, the process of bonding two prisms together can be eliminated and the optical polishing surfaces are allowed to be only the two surfaces that face the first and second light sources in comparison with the optical separator of the type of two prisms bonded together. Therefore, the manufacturing cost of the optical separator 163 can be remarkably reduced.

In the optical pickup device of the fifteenth embodiment, the optical separator 163 is formed of the parallel plate type transparent integrated member. However, it is acceptable to form the optical separator of a wedge type transparent integrated member made of a synthetic quartz or BK-7 or a non-parallel plate type transparent integrated member made of a synthetic quartz or BK-7. Also, in this case, the same effects as in the case where the parallel plate type transparent integrated member is employed can be obtained.

Sixteenth Embodiment

Figure 17A:
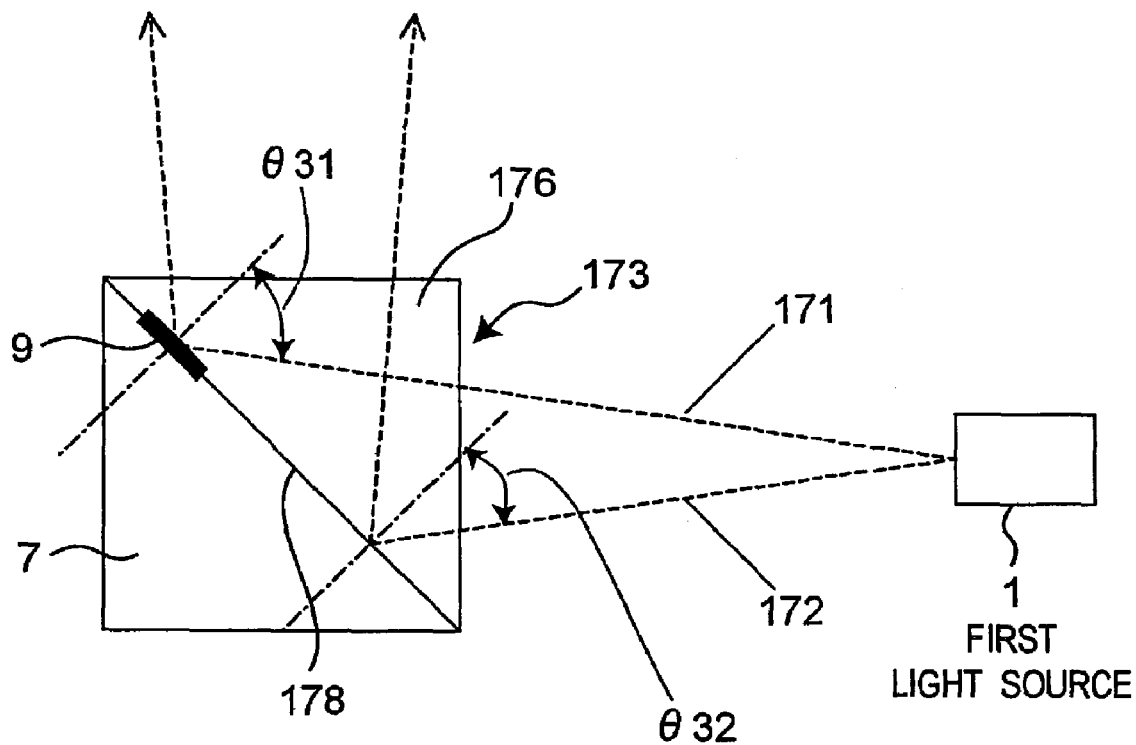
FIG. 17A is a schematic view of an optical pickup device according to a sixteenth embodiment of the present invention.

FIG. 17A is a schematic view of the optical pickup device of the sixteenth embodiment. The optical pickup device of the sixteenth embodiment differs from the optical pickup device of the first embodiment only in that the film characteristic of a wavelength selecting film 178 is not uniform.

In the optical pickup device of the sixteenth embodiment, the same components as those of the optical pickup device of the first embodiment are denoted by the same reference numerals, and no description is provided therefor.

In the optical pickup device of the sixteenth embodiment, a position, which belongs to the wavelength selecting film 178 and in which the reflectance is maximized, of the first laser beam, which is emitted from the first light source 1 and is reflected by the wavelength selecting the film 178, is located in a portion, which belongs to the wavelength selecting film 178 and faces the center position of the reflection film 9.

Figure 17B:
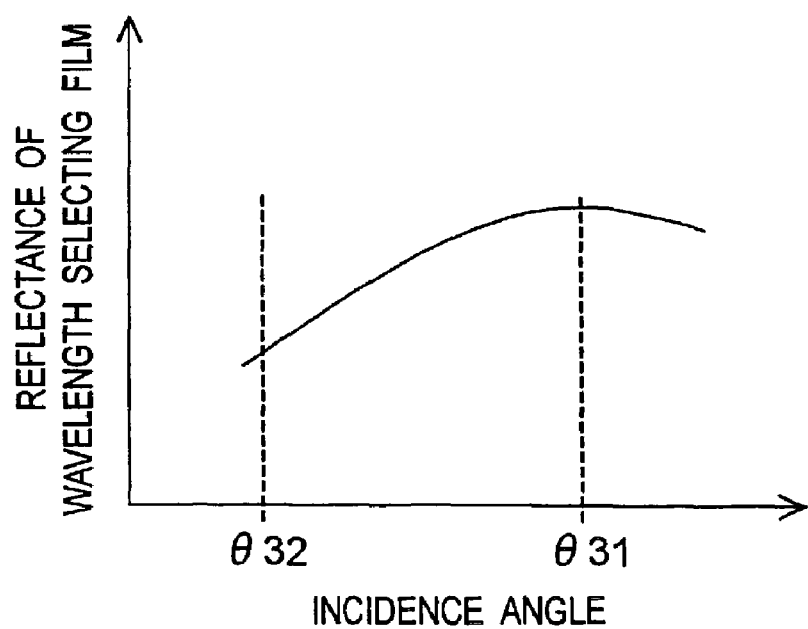
FIG. 17B is a graph showing the relation between the incidence angle of a first laser beam with respect to a wavelength selecting film and the reflectance of the first laser beam on the wavelength selecting film.

FIG. 17B is a graph showing the relation between the incidence angle of the first laser beam incident on the wavelength selecting film 178 and the reflectance of the first laser beam on the wavelength selecting film 178.

In FIG. 17B, the reference numeral θ31 indicates the incidence angle of the first laser beam 171 incident on the portion, which belongs to the wavelength selecting film 178 and faces the center position of the reflection film 9, while θ32 indicates the incidence angle of the first laser beam 172 with respect to a portion, which belongs to the wavelength selecting film 178 and is located near the first light source 1.

As shown in FIG. 17B, the reflectance of the first laser beam on the wavelength selecting film 178 is maximized in the portion, which belongs to the wavelength selecting film 178 and faces the center position of the reflection film 9. Then, according to a shift from the portion that faces the center position of the reflection film 9 toward the first light source 1, the reflectance decreases.

According to the optical pickup device of the sixteenth embodiment, the reflectance of the first laser beam on the wavelength selecting film 178 is maximized in the portion, which belongs to the wavelength selecting film 178 and faces the center position of the reflection film 9. Therefore, a trace quantity of the first laser beam transmitted through the wavelength selecting film 178 can be minimized in the portion, which belongs to the wavelength selecting film 178 and faces the center position of the reflection film 9. Therefore, the problem that a trace quantity of the first laser beam, which is emitted from the first light source 1 and transmitted through the wavelength selecting film 178, reaches the reflection film 9, or the reflector and is reflected by this reflection film 9 to become stray light or the problem that the wave surface of the luminous flux of the first laser beam reflected in the region that belongs to the wavelength selecting film 178 and faces the reflection film 9 is disordered by the trace quantity of the first laser beam, which is transmitted through the wavelength selecting film 178 and reflected by the reflection film 9, can be avoided, and the wave front aberration of the luminous flux of the first laser beam can be maintained satisfactory. It is to be noted that the trace quantity of the first laser beam, which belongs to the laser beam transmitted through the wavelength selecting film 178 and is transmitted through the first light source 1 side of the wavelength selecting film 178, is merely transmitted through the triangular prism 7 and causes no problem.

In the optical pickup device of the sixteenth embodiment, the reflectance of the first laser beam on the wavelength selecting film 178 is maximized in the portion, which belongs to the wavelength selecting film 178 and faces the center position of the reflection film 9. However, if the position in which the first laser beam has the maximum reflectance on the wavelength selecting film 178 is provided in a region, which belongs to the wavelength selecting film 178 and faces the reflection film 9, then the same effects as those of the optical pickup device of the sixteenth embodiment can be obtained.

Seventeenth Embodiment

Figure 18:
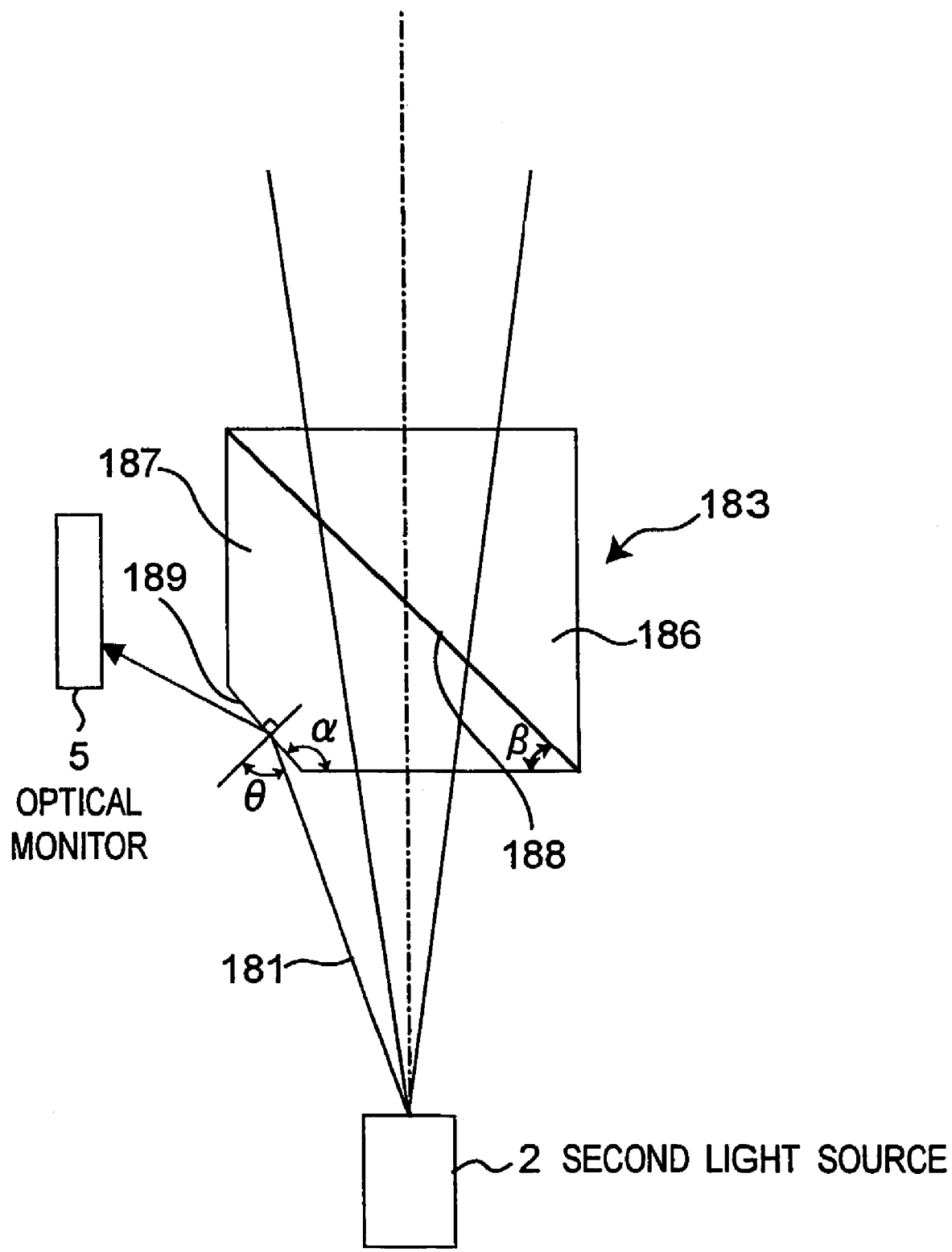
FIG. 18 is a schematic view of an optical pickup device according to a seventeenth embodiment of the present invention.

FIG. 18 is a schematic view of the optical pickup device of the seventeenth embodiment. The optical pickup device of the seventeenth embodiment differs from the optical pickup device of the first embodiment only in that an optical separator 183 is formed by bonding one side surface of a triangular prism 186 located on the first light source (not shown) side to a side surface, which belongs to a prism 187 located on the second light source 2 side that has a rectangular (roughly trapezoidal) cross section in a direction perpendicular to the columnar direction and in which the area is maximum for the replacement of the optical separator.

In the optical pickup device of the seventeenth embodiment, the same components as those of the optical pickup device of the first embodiment are denoted by the same reference numerals, and no description is provided therefor.

The prism 187 is formed by cutting off one corner portion of a triangular prism.

A reflection film 189 is formed as the reflector on a side surface, which belongs to the prism 187, faces the surface of which the area is maximized and has a minimum area, and a wavelength selecting film 188 is formed on the one side surface of the triangular prism 186. The reflection surface 189 is formed of a mirror or the like on which a metal such as Al or a dielectric substance is deposited.

In FIG. 18, the reference numeral 181 denotes one example of the optical path of the second laser beam, which is emitted from the second light source 2, reflected by the reflection surface 189 and thereafter made incident on the second light source optical monitor 5.

According to the optical pickup device of the seventeenth embodiment, the reflection film 189 is provided as the reflector on the side surface, which belongs to the prism 187, faces the surface of which the area is maximized and has a minimum area. Therefore, an angle α made between the side surface, which belongs to the prism 187 and is located on the second light source side and the side surface that has the minimum area or an incidence angle θ of the second laser beam, which is emitted from the second light source 2 and made incident on the reflection surface 189, with respect to the reflection surface 89 can be set independently of an angle β made between the side surface, which belongs to the prism 187 and is located on the second light source side and a wavelength selecting film 188 of the optical separator 183. Therefore, flexibility is provided in the arrangement position of the second light source optical monitor 5, and the downsizing of the optical pickup device can be achieved.

In the optical pickup device of the seventeenth embodiment, the high reflectance of the second laser beam on the reflection film 189 is obtained with the reflection film 189 formed as the reflector by providing the mirror or the like on which a metal such as Al or a dielectric substance is deposited on the side surface, which belongs to the prism 187 and has the minimum area. However, when the quantity of light to the second light source optical monitor 5 can be sufficiently secured, the reflection surface may be provided as a material surface of the same material as the material of the prism 187. The reason for the above is that, even if the material surface, which is the material of the prism, is served as the reflector, several percent of the second laser beam incident on the material surface becomes reflected by this material surface according to the optical Fresnel's formulas. As described above, according to the conventional optical pickup device, the second laser beam from the second light source is reflected by several percent on the wavelength selecting film and guided to the second light source optical monitor. Therefore, even if the material surface, which is the material of the prism, is served as the reflector, the same quantity of light as the quantity of light of the second laser beam, which is detected by the second light source optical monitor of the conventional optical pickup device, can be detected by the second light source optical monitor.

When the material surface, which is the material of the prism, is served as the reflector, the reflector can easily be formed merely by cutting off the corner portion of a triangular prism and subjecting the resulting surface to a polishing process. Therefore, the manufacturing cost of the optical separator can be remarkably reduced.

Eighteenth Embodiment

Figure 19:
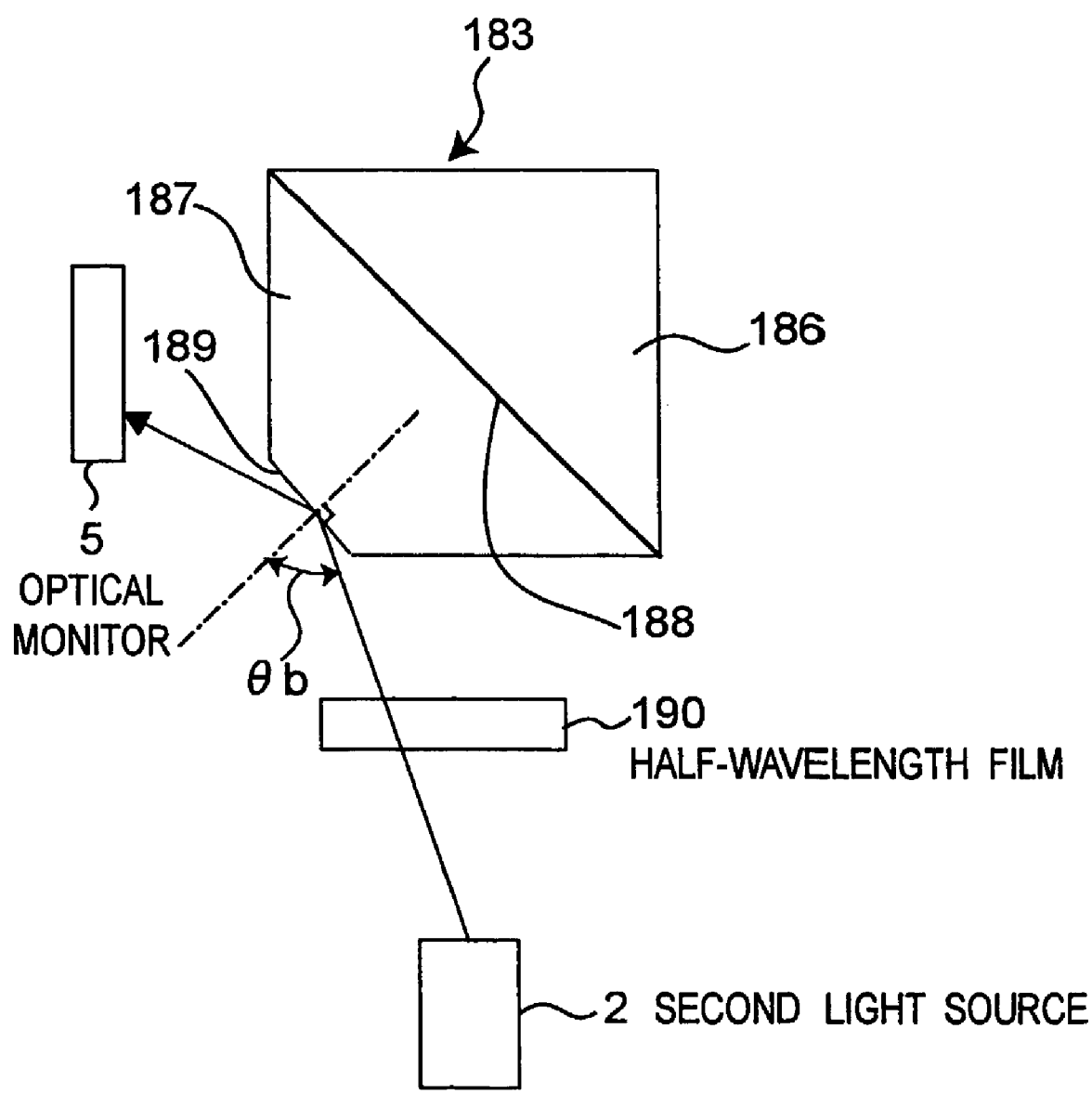
FIG. 19 is a schematic view of an optical pickup device according to an eighteenth embodiment of the present invention.

FIG. 19 is a schematic view of the optical pickup device of the eighteenth embodiment. According to the optical pickup device of the eighteenth embodiment, the points of difference from the optical pickup device of the seventeenth embodiment are that a half-wavelength film 190 as one example of a polarization converter is arranged between a surface, which belongs to the prism 187 located on the second light source 2 side and is located on the second light source 2 side, and the second light source 2, and that, assuming that the incidence angle of the second laser beam, which is emitted from the second light source 2, transmitted through the half-wavelength film 190, reflected by the reflection film 189 and thereafter made incident on the second light source optical monitor 5 with respect to the reflection film 189 is θb and the refractive index of the prism 187 is n, then the relation of the following equation (8) approximately holds between θb and n.

$$\tan \theta_i = n \tag{8}$$

In the optical pickup device of the eighteenth embodiment, the same components as those of the optical pickup device of the seventeenth embodiment are denoted by the same reference numerals, and no description is provided therefor.

The crystalline azimuth of the half-wavelength film 190 is set so that the polarization azimuth of the linearly polarized second laser beam emitted from the second light source 2 becomes roughly S-polarized light with respect to the reflection surface 189.

According to the optical pickup device of the eighteenth embodiment, the half-wavelength film 190 as one example of the polarization converter is arranged between the surface, which belongs to the prism 187 located on the second light source 2 side and faces the second light source 2 and the second light source 2, and the linearly polarized second laser beam emitted from the second light source 2 by this half-wavelength film 190 is roughly S-polarized with respect to the reflection surface 189. Therefore, the second laser beam incident on the reflection surface becomes roughly S-polarized light. Therefore, the reflectance of the S-polarized light becomes higher than the reflectance of the P-polarized light. Accordingly, a larger quantity of the second laser beam can be guided to the second light source optical monitor 5.

Moreover, assuming that the incidence angle of the second laser beam incident on the second light source optical monitor 5 with respect to the reflection film 189 is θb and the refractive index of the prism 187 is n, then the relation of the equation (8) approximately holds between θb and n. Therefore, θb can be Brewster's angle, and the reflectance of the P-polarized light on the reflection film 189 can be zeroed. Therefore, the light concentrated on the optical disk is the S-polarized light component (stimulated emission component) of same wavelength and same phase in the second laser beam, and accordingly, the spontaneous emission component, or the P-polarized light component included a little in the second laser beam emitted from the second light source can be prevented from being incident on the second light source optical monitor. Therefore, only the radiation output of the stimulated emission component of the second laser beam used in actually recording data on the optical disk or reading the data on the optical disk can be detected by the second light source optical monitor 5.

In the optical pickup device of the eighteenth embodiment, the half-wavelength film 190 is arranged between the second light source and the reflection film in making the stimulated emission component, or the S-polarized light component of the second laser beam, incident on the reflection film 189. However, the S-polarized light may be made incident on the reflection film 189 by providing the second light source 2 by a TM mode semiconductor laser instead of employing the half-wavelength film 190. In this case, the TM mode semiconductor laser device means a semiconductor laser device, which emits a laser beam in a direction perpendicular to the active layer of the semiconductor laser device that emits the laser beam with regard to the polarization azimuth of the laser beam. In a semiconductor laser of a wavelength band of 630 to 650 nm, both laser devices of the TM mode in which the polarization azimuth is perpendicular to the active layer and the TE mode in which the polarization azimuth is parallel to the active layer have already been put into practical use. Therefore, by selecting the semiconductor laser device that can oscillate a TM laser beam out of the aforementioned two modes for the light source, the second laser beam incident on the reflector can be the S-polarized light. When the TM mode semiconductor laser device is employed instead of employing the half-wavelength film 190 in order to obtain the S-polarized light, the polarization converter device such as the comparatively expensive half-wavelength film 190 or the like can be eliminated. Therefore, the cost of the optical pickup device can be reduced, and the optical pickup device can be made compact.

Nineteenth Embodiment

Figure 20:
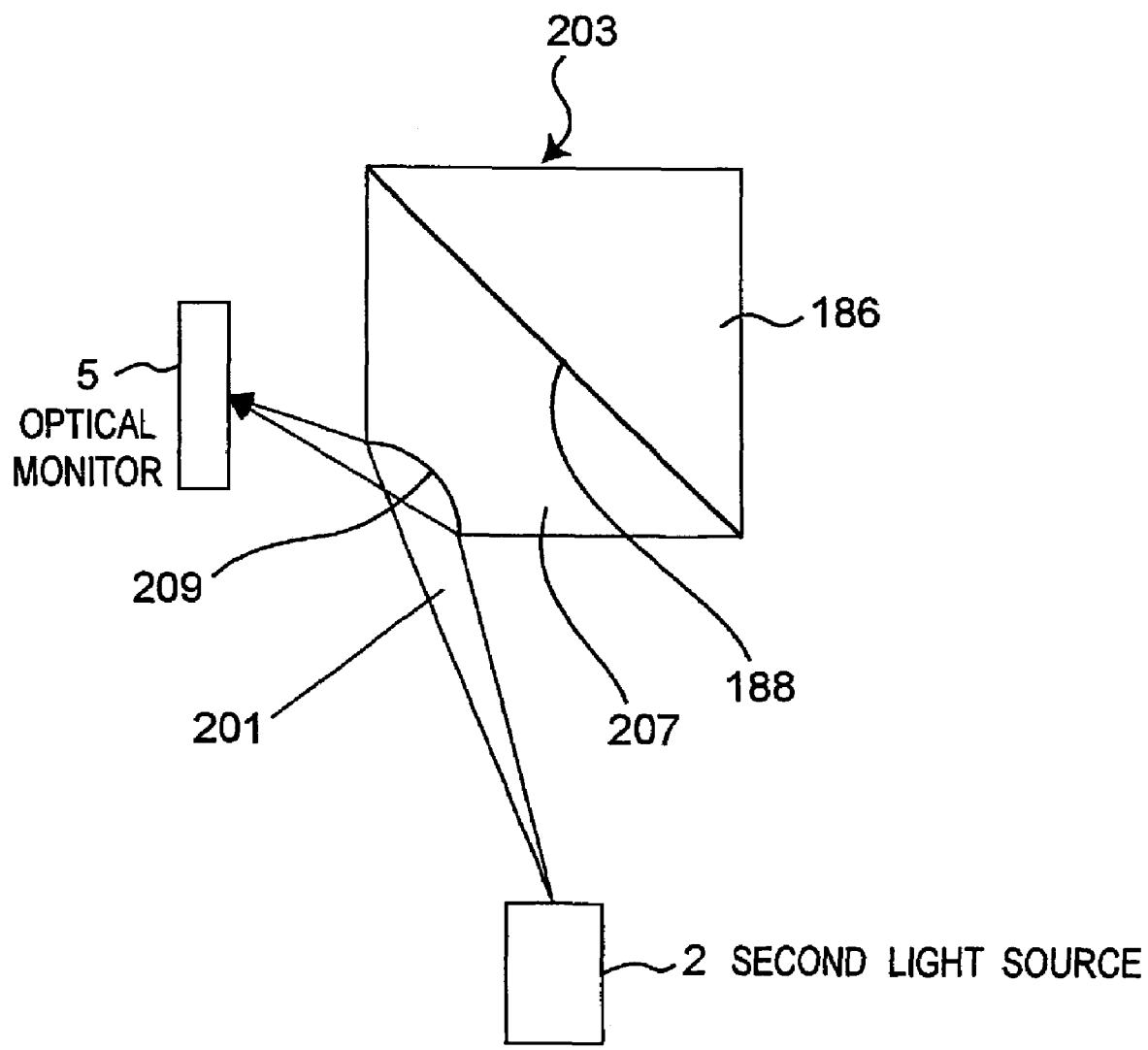
FIG. 20 is a schematic view of an optical pickup device according to a nineteenth embodiment of the present invention.

FIG. 20 is a schematic view of the optical pickup device of the nineteenth embodiment. The optical pickup device of the nineteenth embodiment differs from the optical pickup device of the seventeenth embodiment shown in FIG. 18 in that a reflection surface 209 as one example of the reflector of a prism 207 located on the second light source 2 side has a concave surface.

In the optical pickup device of the nineteenth embodiment, the same components as those of the optical pickup device of the seventeenth embodiment are denoted by the same reference numerals, and no description is provided therefor.

The reflection surface 209, which is the concave surface, is a material surface of the same material as the material of the prism 207.

According to the optical pickup device of the nineteenth embodiment, the reflection surface 209 as one example of the reflector is the concave surface. Therefore, scattered light, which is the second laser beam emitted from the second light source 2, can be reflected by the reflection surface 209, or the concave surface toward the light-receiving surface of the second light source optical monitor 5, and the scattered light, which is the second laser beam emitted from the second light source 2 by the operation of the reflection surface 209, or the concave surface can concurrently be converged on the light-receiving surface of the second light source optical monitor 5. Therefore, the second laser beam of the larger quantity of light can be made incident on the second light source optical monitor 5.

It is also acceptable to construct an optical pickup device of a new embodiment by combining a plurality of inventive parts of the optical pickup devices of the present invention, which have been described in connection with the optical pickup devices of the first through nineteenth embodiments. Then, in the case of such an optical pickup device, the optical pickup device is allowed to have higher quality by virtue of the synergistic effects of the plurality of inventive parts.

As is apparent from the above, according to the optical pickup device of the present invention, the wavelength selecting film, which reflects the first laser beam emitted from the first light source toward the object lens, transmits therethrough the second laser beam emitted from the second light source and makes the light incident on the object lens, is arranged so as not to be brought in contact with the reflector, which transmits therethrough the second laser beam emitted from the second light source and makes the light incident on the object lens. Therefore, by appropriately adjusting the positions of the wavelength selecting film and the reflector, the second laser beam, which is emitted from the second light source and made incident on the wavelength selecting film, can be totally transmitted toward the object lens. Therefore, the second laser beam is not required to be reflected by several percent on the wavelength selecting film dissimilarly to the conventional optical pickup device. Therefore, the quantity of light of the second laser beam concentrated on the data recording surface of the optical disk via the object lens can be increased, and the data reproducing capability and the data recording capability of the optical disk can be improved.

Moreover, the wavelength selecting film and the reflector are provided so as not to be brought in contact with each other, and therefore, the wavelength selecting film and the reflector can be formed through different processes. Therefore, the problem occurring in the conventional optical pickup device in which the wavelength selecting film is formed on one side surface of the triangular prism and thereafter the reflection film, or the reflector is formed on the wavelength selecting film, i.e., the problem that the wavelength selecting film is changed in quality by applying a film stress to the wavelength selecting film of the groundwork in the vapor deposition process for forming the reflection film, or the reflector or the problem that the wavelength selecting film of the groundwork is damaged by heat during the vapor deposition of the reflection film or by the handling work can be avoided, allowing the manufacturing yield of the optical separator to be improved and allowing the manufacturing cost of the optical separator to be reduced.

Twentieth Embodiment

Figure 21:
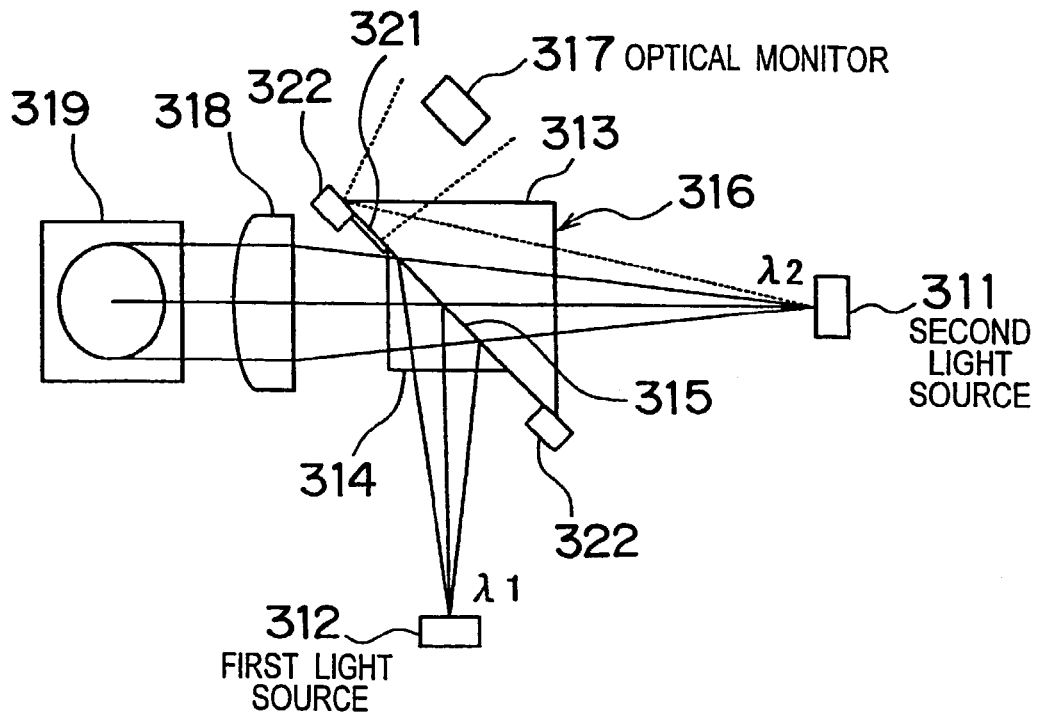
FIG. 21 is a schematic view of an optical pickup device according to a twentieth embodiment of the present invention.

FIG. 21 is a schematic view of the optical pickup device of the twentieth embodiment, although FIG. 21 shows only an optical output system.

The optical pick-up device of the present embodiment is to perform recording and reproducing of a CD and a DVD and has a first light source 312 that emits a laser beam of a wavelength $\lambda 1$ (=650 nm) for DVD, a second light source 311 that emits a laser beam of a wavelength $\lambda 2$ (=780 nm) for CD, an optical separator having a cube prism 316 obtained by bonding together first and second rectangular prisms 314 and 313 with interposition of a wavelength selecting film 315, an optical monitor 317, a collimator lens 318 and a riser mirror 319.

In the optical separator, the second rectangular prism 313 is larger in size than the first rectangular prism 314. The base of the second rectangular prism 313 is longer than the base of the first rectangular prism 314, and both ends of the base of the second rectangular prism 313 protrude from the base of the first rectangular prism 314. A reflection mirror 321 is provided at one end portion of the base of the second rectangular prism 313 that protrudes from the base of the first rectangular prism 314, in a superposed manner on the base. This reflection mirror 321 almost totally reflects light and has an almost constant reflectance regardless of the wavelength of light.

The base of the second rectangular prism 313 is positioned in place by abutting both ends of the base of the second rectangular prism 313 against respective housing portions 322. The wavelength selecting film 315 and the reflection mirror 321 are superposed on the base of the second rectangular prism 313. Therefore, the wavelength selecting film 315 and the reflection mirror 321 are concurrently aligned by the positioning of the base of the second rectangular prism 313. Moreover, since the reflection mirror 321 is arranged in the portion of the base of the second rectangular prism 313, the arrangement space of the reflection mirror 321 can be restrained, and this prevents an increase in the size of the optical pickup device.

Figure 22:
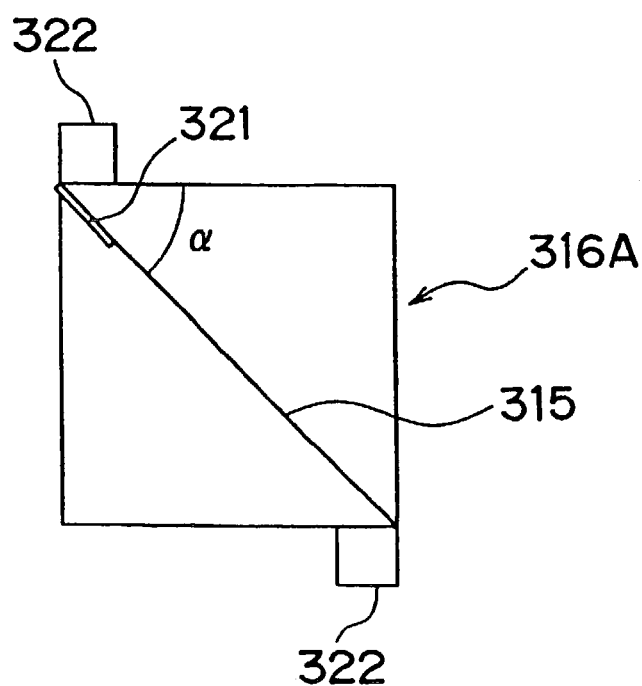
FIG. 22 is a view showing a modification example of a cube prism in the device of FIG. 21.

It is acceptable to make a cube prism 316A, which is obtained by bonding together two rectangular prisms of same size as shown in FIG. 22, abut against the two housing portions 322. In this case, the mounting accuracy of the wavelength selecting film 315 and the reflection mirror 321 is deteriorated by an error of an angle α of the rectangular prism. Therefore, in the device of FIG. 21, it can be said that the wavelength selecting film 315 and the reflection mirror 321 are positioned with high accuracy.

The wavelength selecting film 315 reflects most of the laser beam of the wavelength $\lambda 1$ from the first light source 312 and transmits several percent of the laser beam of the wavelength $\lambda 1$. Therefore, most of the laser beam of the wavelength $\lambda 1$ incident on the wavelength selecting film 315 is reflected by the wavelength selecting film 315, made incident on the riser mirror 319 through the collimator lens 318, reflected by the riser mirror 319 and outputted through an object lens (not shown). Several percent of the laser beam of the wavelength $\lambda 1$ incident on the wavelength selecting film 315 is transmitted through the wavelength selecting film 315 and made incident on the optical monitor 317, and the quantity of light is detected by the optical monitor 317.

On the other hand, the wavelength selecting film 315 transmits the whole or most of the laser beam of the wavelength $\lambda 2$ from the second light source 311. Therefore, the whole or most of the laser beam of the wavelength $\lambda 2$ incident on the wavelength selecting film 315 is transmitted through the wavelength selecting film 315 and outputted via the collimator lens 318, the riser mirror 319 and the object lens.

Further, the reflection mirror 321 reflects part of the laser beam of the wavelength $\lambda 2$ from the second light source 311, the part falling outside the wavelength selecting film 315, and guides the part of this laser beam to the optical monitor 317. The optical monitor 317 detects the light quantity of the part of the laser beam received. This reflection mirror 321 has an almost constant reflectance regardless of the wavelength of light. Therefore, even if the wavelength $\lambda 2$ of the laser beam of the second light source 311 fluctuates due to a temperature change or the like, the quantity of received light of the laser beam in the optical monitor 317 is prevented from fluctuating, and the quantity of light of the laser beam can be accurately detected by the optical monitor 317.

As described above, in the present embodiment, the reflection mirror 321 is provided at one end of the base of the second rectangular prism 313, and part of the laser beam from the second light source 311 is reflected by this reflection mirror 321. The reflected part of the laser beam is guided to the optical monitor 317, and is detected by the optical monitor 317. The reflectance of this reflection mirror 321 is almost constant regardless of the wavelength of incident light. Therefore, even if the wavelength $\lambda 2$ of the laser beam fluctuates due to a temperature change or the like, the quantity of received light at the optical monitor 317 hardly fluctuates, and the quantity of light of the laser beam can be accurately detected by the optical monitor 317.

In the present embodiment, the first and second prisms do not necessarily need to be rectangular prisms, but other triangular prisms and planar prisms may be used as appropriate. This is also true with the following embodiments.

Twenty-first Embodiment

Figure 23:
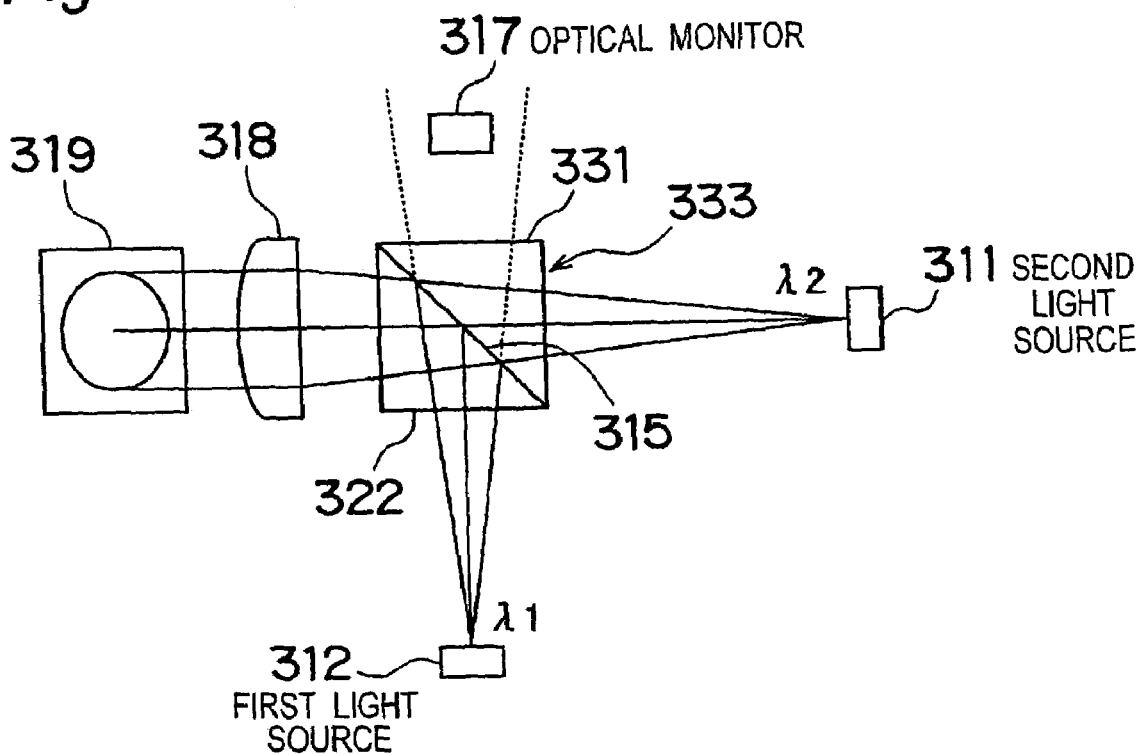
FIG. 23 is a schematic view of an optical pickup device according to a twenty-first embodiment of the present invention.
Figure 24:
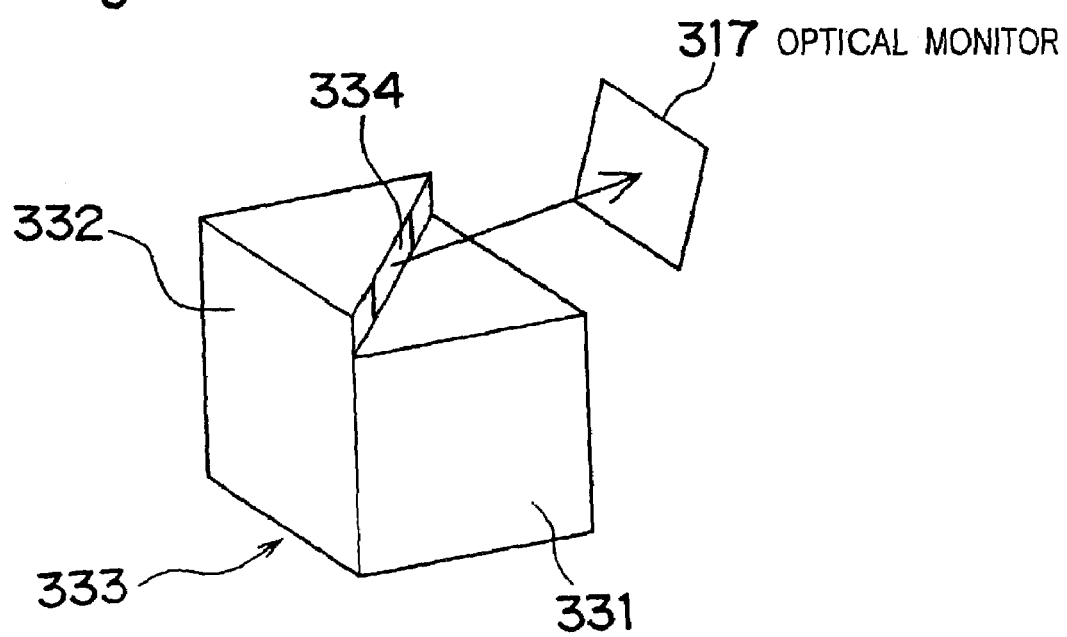
FIG. 24 is a perspective view showing a cube prism in the device of FIG. 23.

FIG. 23 is a schematic view of the optical pickup device of the twenty-first embodiment. FIG. 24 is a perspective view of a cube prism of the device of the present embodiment. In FIGS. 23 and 24, the components that function similar to those of the device of FIG. 21 are denoted by same reference numerals.

In the present embodiment, a cube prism 333 obtained by bonding together first and second rectangular prisms 332 and 331 with interposition of the wavelength selecting film 315 is adopted in place of the cube prism 316 of the device of FIG. 21. The first rectangular prism 332 has a width greater than a width of the second rectangular prism 331, and a reflection mirror 334 is arranged in a superposed manner on the base of the first rectangular prism 332 that protrudes from the second rectangular prism 331 in the widthwise direction. With this arrangement, the arrangement space of the reflection mirror 334 can be restrained, and this prevents an increase in the size of the optical pickup device.

Also, in this case, most of the laser beam of the wavelength $\lambda 1$ from the first light source 312 is reflected by the wavelength selecting film 315, and travels via the collimator lens 318, the riser mirror 319 and the object lens to be outputted to a loaded optical disk. Moreover, several percent of the laser beam of the wavelength $\lambda 1$ is transmitted through the wavelength selecting film 315 and made incident on the optical monitor 317, and the quantity of light is detected by the optical monitor 317.

On the other hand, the wavelength selecting film 315 transmits the whole or most of the laser beam of the wavelength $\lambda 2$ from the second light source 311. Therefore, the whole or most of the laser beam of the wavelength $\lambda 2$ incident on the wavelength selecting film 315 is transmitted through the wavelength selecting film 315 and outputted via the collimator lens 318, the riser mirror 319 and the object lens to an optical disk.

Further, the reflection mirror 334 reflects part of the laser beam of the wavelength $\lambda 2$ from the second light source 311 to the optical monitor 317, the part falling outside the wavelength selecting film 315. This reflection mirror 334 has an almost constant reflectance regardless of the wavelength. Therefore, even if the wavelength $\lambda 2$ of the second light source 311 fluctuates due to a temperature change or the like, the quantity of received laser beam at the optical monitor 317 hardly fluctuates, and the quantity of light of the laser beam can be accurately detected by the optical monitor 317.

Twenty-second Embodiment

Figure 25:
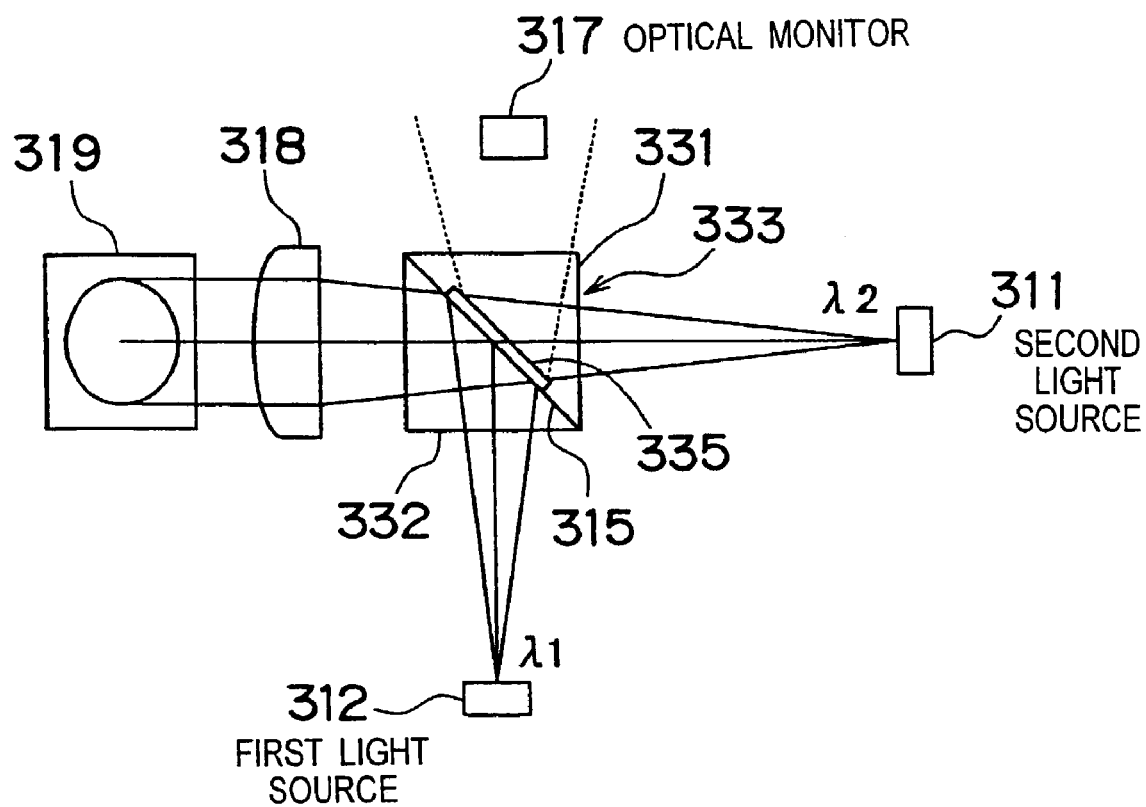
FIG. 25 is a schematic view of an optical pickup device according to a twenty-second embodiment of the present invention.
Figure 26:
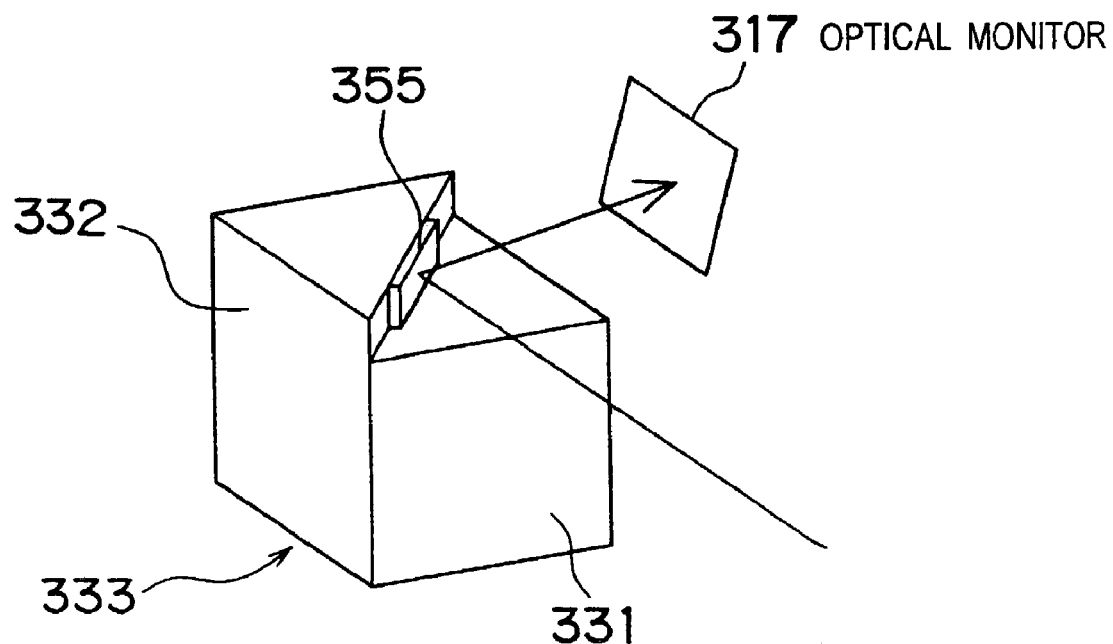
FIG. 26 is a perspective view showing a cube prism in the device of FIG. 25.

FIG. 25 is a schematic view of the optical pickup device of the twenty-second embodiment. FIG. 25 is a perspective view showing a cube prism of the device of the present embodiment. In FIGS. 25 and 26, the components that function similar to those of the devices of FIGS. 21 and 23 are denoted by same reference numerals.

In the present embodiment, a cube prism 333 obtained by bonding together first and second rectangular prisms 332 and 331 with interposition of the wavelength selecting film 315 therebetween is adopted similarly to the device of FIG. 23. A reflection mirror 335 is mounted at an appropriate angle on the base of the first rectangular prism 332 that protrudes from the second rectangular prism 331 in the widthwise direction. For example, the mounting angle of the reflection mirror 335 is set by placing, for example, a spacer (not shown) between the base of the first rectangular prism 332 and the reflection mirror 335.

In this case, even if the position of the optical monitor 317 is changed, the mounting angle of the reflection mirror 335 can be appropriately adjusted so that a peripheral part of the laser beam from the second light source 311 can be reflected by the reflection mirror 335 and guided to the optical monitor 317.

Alternatively, the reflection mirror 335 may be mounted at an appropriate angle on an end surface of a cube prism obtained by bonding together first and second rectangular prisms of same size.

Twenty-third Embodiment

Figure 27:
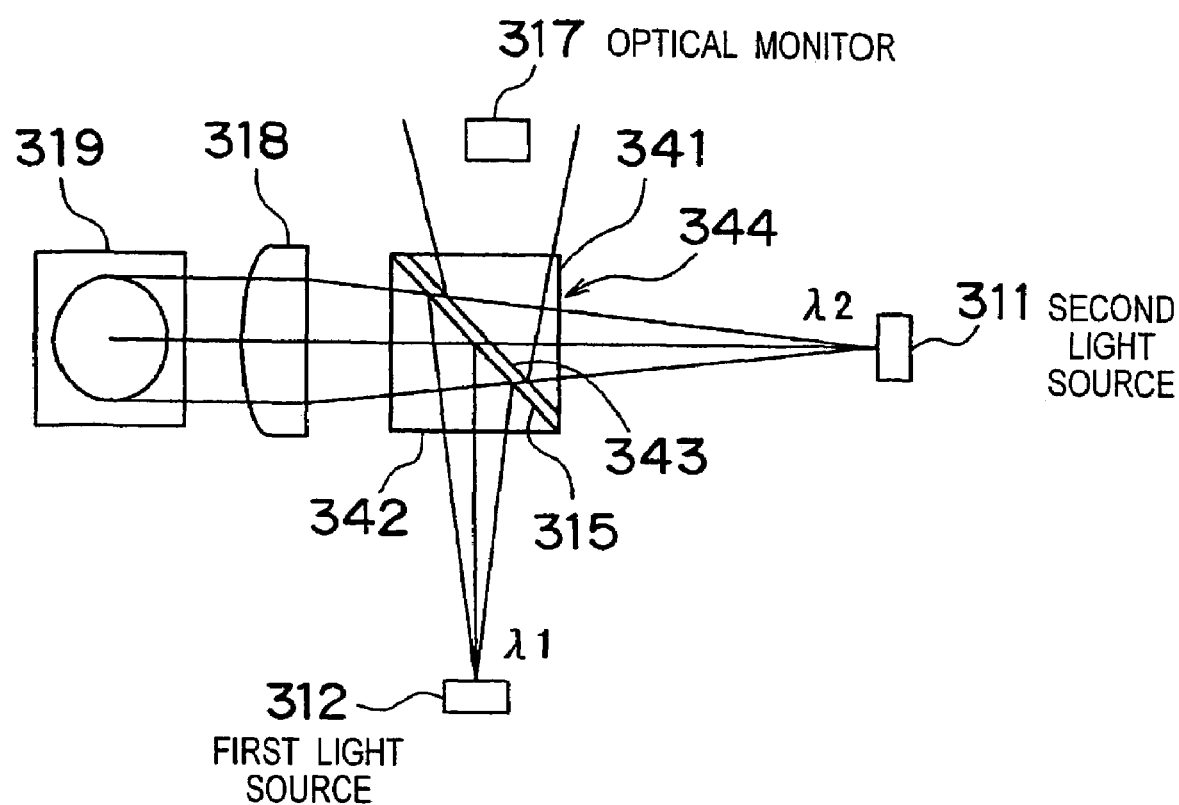
FIG. 27 is a schematic view of an optical pickup device according to a twenty-third embodiment of the present invention.
Figure 28:
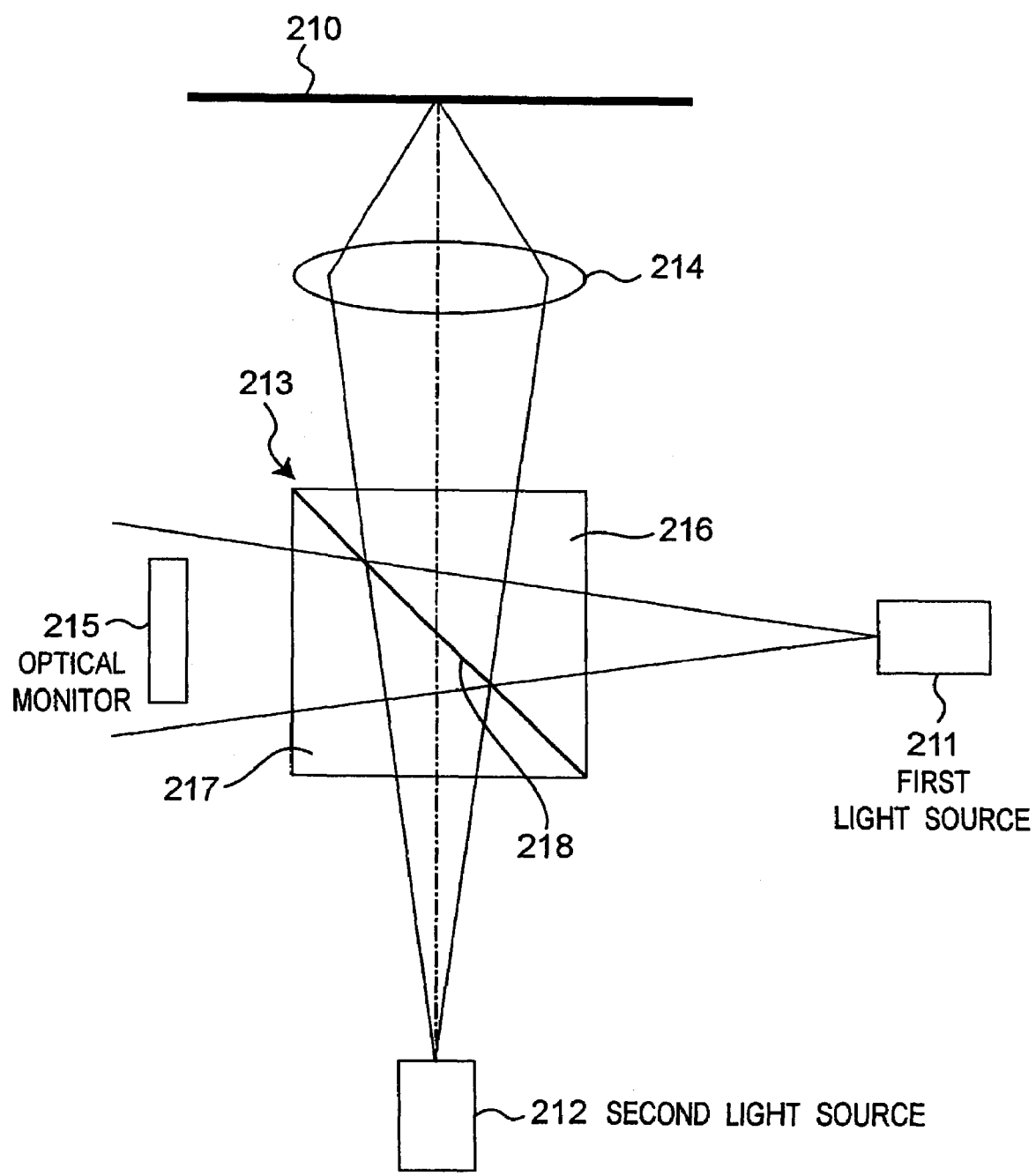
FIG. 28 is a sectional view of a conventional optical pickup device.

FIG. 27 is a schematic view of the optical pickup device of the twenty-third embodiment. In FIG. 27, components that function similar to those of the device of FIG. 21 are denoted by same reference numerals.

In the device of the present embodiment, adopted in place of the cube prism 316 of the device of FIG. 21 is a cube prism 344 obtained by bonding together first and second rectangular prisms 342 and 341 with interposition of a wavelength selecting film 315 and a half-reflection film 343 therebetween. The half-reflection film 343 is superposed on the wavelength selecting film 315 directly or with interposition of a light-transmitting layer (not shown). This half-reflection film 343 transmits most of the laser beam of the wavelength λ2 from the second light source 311 while reflecting several percent of the laser beam, and has an almost constant reflectance regardless of the wavelength.

In this case as well, most of laser beam of the wavelength λ1 from the first light source 312 is reflected by the wavelength selecting film 315 and outputted via the collimator lens 318, the riser mirror 319 and the object lens. Moreover, several percent of the laser beam of the wavelength λ1 is transmitted through the wavelength selecting film 315 and made incident on the optical monitor 317, and the quantity of light is detected by the optical monitor 317.

On the other hand, the half-reflection film 343 reflects several percent of the laser beam of the wavelength λ2 from the second light source 311 and guides part of this laser beam to the optical monitor 317. The reflectance of this half-reflection film 343 is almost constant regardless of the wavelength. Therefore, even if the wavelength λ2 of the laser beam of the second light source 311 fluctuates due to a temperature change or the like, the quantity of received light of the laser beam in the optical monitor 317 hardly fluctuates, and the quantity of light of the laser beam can be accurately detected by the optical monitor 317.

The wavelength selecting film 315 transmits the whole or most of the laser beam incident from the second light source 311 via the half-reflection film 343. Then, the laser beam transmitted through this wavelength selecting film 315 is outputted via the collimator lens 318, the riser mirror 319 and the object lens.

As described above, in the present embodiment, the half-reflection film 343 is superposed on the wavelength selecting film 315 to reflect several percent of the laser beam from the second light source 311 to the optical monitor 317. The reflectance of this half-reflection film 343 is almost constant regardless of the wavelength. Therefore, even if the wavelength λ2 of the laser beam fluctuates, the quantity of received light at the optical monitor 317 hardly fluctuates, and the quantity of light of the laser beam can be accurately detected by the optical monitor 317.

It is to be noted that the present invention is not limited to the aforementioned embodiments and able to be modified in various ways. For example, the wavelengths of the laser beams of the first and second light sources may be arbitrarily set. Moreover, the device of the present invention may be concurrently used with another device or method for accurately detecting the quantity of light of the first light source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device comprising:
   a first light source that emits a first laser beam of a wavelength;
   a second light source that emits a second laser beam having a wavelength different from the wavelength of the first laser beam;
   an object lens configured to concentrate the first and second laser beams on a data recording surface of an optical disk;
   an optical monitor configured to detect a quantity of light of the second laser beam; and
   an optical separator having,
      a wavelength selecting film configured to reflect the first laser beam emitted from the first light source toward the object lens, and to transmit the second laser beam emitted from the second light source to the object lens, and
      a reflector configured to reflect a part of the second laser beam emitted from the second light source toward the optical monitor;
   the optical separator having a first prism located on a side proximate to the first light source and a second prism located on a side proximate to the second light source, wherein
   at least a part of one side surface of the first prism is bonded to at least a part of one side surface of the second prism with the wavelength selecting film placed between the bonded part of the one side surface of the first prism and the bonded part of the one side surface of the second prism; and
   said one side surface of the second prism comprises an exposed non-contact surface which extends from the bonded part thereof and which does not contact with said one side surface of the first prism, said non-contact surface of the second prism comprising the reflector.

2. The optical pickup device as claimed in claim 1, wherein the first and second prisms are rectangular prisms.

3. The optical pickup device as claimed in claim 1, wherein the wavelength selecting film roughly totally reflects the first laser beam and roughly totally transmits the second laser beam.

4. The optical pickup device as claimed in claim 1, wherein a luminous flux diameter of the first laser beam incident on and reflected from the wavelength selecting film to the object lens is larger than a luminous flux diameter of the second laser beam transmitted through the wavelength selecting film to the object lens.

5. The optical pickup device as claimed in claim 1, wherein the optical separator is arranged in optical paths of radiant light beams emitted from the first light source and the second light source, and an optical path length of the first laser beam, which is emitted from the first light source and travels through the optical separator, is longer than an optical path length of the second laser beam, which is emitted from the second light source and travels through the optical separator.

6. The optical pickup device as claimed in claim 1, wherein the optical separator is arranged in optical paths of radiant light beams emitted from the first light source and the second light source, and the reflector is arranged in a position located not adjacent to the second light source.

7. The optical pickup device as claimed in claim 1, comprising a hologram element between the second light source and the optical separator, wherein at least part of light emitted from the second light source and diffracted by the hologram element is reflected by the reflector and made incident on the optical monitor.

8. The optical pickup device as claimed in claim 7, wherein assuming that an angle made between an optical axis of the second laser beam that is emitted from the second light source and travels in a straight line without being diffracted by the hologram element, a normal line of the wavelength selecting film of the optical separator is θa, and that a diffraction angle of a first-order diffracted light, which was originally emitted from the second light source and primarily diffracted by the hologram element and will be made incident on the optical monitor via the reflector, is θh, then a condition of:

$2\theta a + \theta h \approx 90°$ holds.

9. The optical pickup device as claimed in claim 8, wherein the angle θa made between an optical axis of the second laser beam that is emitted from the second light source and travels in a straight line without being diffracted by the hologram element, and the normal line of the wavelength selecting film of the optical separator satisfies a condition of:

$30° \leq \theta a \leq 37°$, and the diffraction angle θh of the first-order diffracted light satisfies a condition of:

$11° \leq \theta h \leq 35°$.

10. The optical pickup device as claimed in claim 7, wherein when a refractive index of the second prism is n, an angle made between a normal line of the one side surface of the first prism and an optical axis of light components of the second laser beam which were not diffracted by the hologram element is θa, and a diffraction angle of a first-order diffracted light, which was originally emitted from the second light source and primarily diffracted by the hologram element and is configured to be made incident on the optical monitor via the reflector, is θh, then a relationship of:

$n \times \sin(\theta a + (\sin^{-1}(\sin \theta h / n))) \geq 1$ holds.

11. The optical pickup device as claimed in claim 1, wherein the second prism is a triangular prism, and the noncontact surface is provided to the second prism by forming the first prism into a configuration of a triangular prism with a noncontact surface-side corner thereof cut off such that the second prism has, on its noncontact surface side, a surface roughly parallel to an optical axis of the second laser beam to be incident on the object lens.

12. The optical pickup device as claimed in claim 1, wherein the first and second prisms are triangular prisms.

13. The optical pickup device as claimed in claim 1, wherein the first prism is a triangular prism, and the second prism has a noncontact surface which continues, via a stepped portion, to the surface bonded to the first prism and which is not brought in contact with the first prism.

14. The optical pickup device as claimed in claim 1, wherein the second prism is a triangular prism, and the first prism has a noncontact surface which continues, via a stepped portion, to the surface bonded to the second prism and which is not brought in contact with the second prism.

15. The optical pickup device as claimed in claim 1, wherein the optical separator is arranged in an optical path of radiant light emitted from the first light source; and with respect to the first laser beam emitted from the first light source, the wavelength selecting film has a maximum reflectance in a region facing the reflector.

16. The optical pickup device as claimed in claim 1, wherein the second light source and the optical separator are arranged such that a relationship of $n \times \sin \psi \geq 1$ holds, where n is a refractive index of the second prism, and ψ is an incidence angle at which the second laser beam emitted from the second light source is configured to be incident upon the exposed noncontact surface of the second prism.

17. The optical pickup device as claimed in claim 1, wherein the second prism is a triangular prism, and the noncontact surface is provided to the second prism by forming the first prism into a configuration of a triangular prism with a noncontact surface-side corner thereof cut off.

* * * * *